(12) United States Patent
Brailko

(10) Patent No.: US 12,511,703 B2
(45) Date of Patent: Dec. 30, 2025

(54) RENDERING PIPELINE FOR TILED IMAGES

(71) Applicant: Leica Biosystems Imaging, Inc., Vista, CA (US)

(72) Inventor: Nickolay Brailko, Vista, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 228 days.

(21) Appl. No.: 18/224,622

(22) Filed: Jul. 21, 2023

(65) Prior Publication Data

US 2023/0360167 A1    Nov. 9, 2023

Related U.S. Application Data

(63) Continuation of application No. PCT/US2022/015680, filed on Feb. 8, 2022.

(60) Provisional application No. 63/149,024, filed on Feb. 12, 2021.

(51) Int. Cl.
| | |
|---|---|
| *G06T 1/20* | (2006.01) |
| *G06T 1/60* | (2006.01) |
| *G06T 9/00* | (2006.01) |
| *G06T 11/00* | (2006.01) |

(52) U.S. Cl.
CPC ............. *G06T 1/20* (2013.01); *G06T 1/60* (2013.01); *G06T 9/00* (2013.01); *G06T 11/001* (2013.01); *G06T 2210/52* (2013.01)

(58) Field of Classification Search
CPC .... G06T 1/20; G06T 1/60; G06T 9/00; G06T 11/001; G06T 15/005; G06T 15/04; G06T 2210/36; G06T 2210/52; G09G 5/363; G09G 2310/04; G09G 2340/02; G09G 2360/02; G09G 2360/08; G09G 2360/121; G09G 2360/122; G09G 2360/127; G09G 2360/18
USPC .......................................................... 345/582
See application file for complete search history.

(56) References Cited

U.S. PATENT DOCUMENTS

| | | | |
|---|---|---|---|
| 8,587,602 B2 * | 11/2013 | Grossman ............... | G06T 15/04 345/585 |
| 9,639,956 B2 * | 5/2017 | Krishnaswamy ......... | G06T 7/40 |
| 9,875,076 B1 * | 1/2018 | Fausak ..................... | G06T 1/60 |

OTHER PUBLICATIONS

Cem Yuksel et al., Rethinking Texture Mapping, Computer Graphics Forum, vol. 38, Issue 2, Jun. 2019, pp. 535-551.*

* cited by examiner

*Primary Examiner* — Jacinta M Crawford
(74) *Attorney, Agent, or Firm* — FROST BROWN TODD LLP

(57) ABSTRACT

Features are disclosed for rendering an image using a GPU and CPU based rendering pipeline. An imaging system may include a GPU and a CPU that each include a portion of an image renderer. A component of the GPU can process the set of image tiles to generate a texture with a wrapped tile coordinate. A component of the GPU can further store the image data as a level of a texture pyramid. As subsequent image data is received, a component of the GPU can access the texture pyramid to determine previously stored image tiles. A component of the GPU can use the previously stored image tiles in rendering the subsequent image data.

18 Claims, 9 Drawing Sheets

RENDERING PIPELINE FOR TILED IMAGES

RELATED APPLICATION(S)

This application is a continuation of International Application Number PCT/US2022/015680, filed Feb. 8, 2022, entitled RENDERING PIPELINE FOR TILED IMAGES, which claims the benefit of priority of U.S. Provisional Patent Application No. 63/149,024, filed Feb. 12, 2021, entitled RENDERING PIPELINE FOR TILED IMAGES, which are incorporated herein by reference entirely.

BACKGROUND

Technical Field

Embodiments of the invention relate to electronic systems, and in particular, to imaging devices.

Description of Related Technology

An imaging system can be used to capture an image of a desired scene. Thereafter, the image can be used for a variety of purposes, including, for example, visual image analysis. For example, an imaging system can capture an image and perform the visual image analysis on the image to determine particular image characteristics of the image. Examples of imaging systems include, but are not limited to, cameras, scanners, mobile devices, tablets, laptops, and wearable electronics. In a medical application, visual image analysis can aid in medical diagnosis and examination.

SUMMARY

One aspect of the present disclosure is an imaging apparatus. The imaging apparatus can further include a first hardware processing unit (e.g., a graphical processing unit) that can obtain a plurality of image tiles from a second hardware processing unit (e.g., a central processing unit) over a bus. In some embodiments, the first hardware processing unit may include a graphical processing unit and/or the second hardware processing unit may include a central processing unit. The imaging apparatus can include the central processing unit that can receive the plurality of image tiles of a region of interest of an image and cache the plurality of image tiles in a cache of the central processing unit. In some embodiments, the central processing unit may obtain the plurality of image tiles from a cache of the central processing unit controlled by or physically embedded in the central processing unit or a memory circuit of the central processing unit controlled by or physically embedded in the central processing unit. The graphical processing unit can, based on the execution of instructions stored by a memory circuit, generate a texture from the plurality of image tiles. The texture may correspond to an object of a cache of the graphical processing unit. Further, the graphical processing unit can store the texture. The graphical processing unit can generate a first mask based on masking the texture. Further, the graphical processing unit can cause display of a view corresponding to the region of interest of the image based at least in part on the first mask.

In another aspect of the present disclosure, the central processing unit can identify, using a texture map, a second plurality of image tiles of a second region of interest of the image that are absent from the texture.

In another aspect of the present disclosure, the graphical processing unit can obtain the second plurality of image tiles from the central processing unit over the bus. Further, the graphical processing unit can update the texture to generate an updated texture based on processing the second plurality of image tiles. Further, the graphical processing unit can store the updated texture.

In another aspect of the present disclosure, the texture may have at least one tile coordinate wrapped using toroidal wrapping.

In another aspect of the present disclosure, the texture may be wrapped in two dimensions.

In another aspect of the present disclosure, the texture may be aligned to a tile size.

In another aspect of the present disclosure, the graphical processing unit can generate a frame buffer based on masking the texture using the first mask. The displayed view may correspond to a clipped portion of the frame buffer.

In another aspect of the present disclosure, the plurality of image tiles may include a plurality of compressed image tiles. The central processing unit can read the plurality of compressed image tiles and decompress the plurality of compressed image tiles using a decompressor.

In another aspect of the present disclosure, the graphical processing unit can store the texture as a level of a texture pyramid.

In another aspect of the present disclosure, the texture pyramid may include the level and a thumbnail.

In another aspect of the present disclosure, the texture pyramid may include a plurality of levels each corresponding to a different resolution level of the image.

In another aspect of the present disclosure, the level of the texture pyramid may be a first level. The view displayed may include a first portion with a first resolution level obtained from the first level of the texture pyramid and a second portion with a second resolution level obtained from a second level of the texture pyramid.

In another aspect of the present disclosure, the graphical processing unit can update the second region from the second resolution level to the first resolution level in response to an update of the first level of the texture pyramid.

In another aspect of the present disclosure, the plurality of image tiles may include a first set of image tiles and a second set of image tiles. Further, to obtain the plurality of image tiles from the central processing unit over the bus, the graphical processing unit may obtain, in parallel, a first image tile from the first set of image tiles and a second image tile from the second set of image tiles.

In another aspect of the present disclosure, to obtain the plurality of image tiles from the central processing unit over the bus, the graphical processing unit may obtain the plurality of image tiles using picture buffer objects.

In another aspect of the present disclosure, the graphical processing unit can store the texture in a first level of a texture pyramid. Further, the graphical processing unit can obtain a second plurality of image tiles from the central processing unit over the bus. The graphical processing unit can process the second plurality of image tiles to generate an update to the texture pyramid based at least in part one or more of a zoom factor or a size of view. Further, the graphical processing unit can store the update to the texture as a second level of the texture pyramid having a lower resolution level than the first level of the texture pyramid.

In another aspect of the present disclosure, the graphical processing unit, prior to causing display of the view, may one or more of pan the view, zoom the view, rotate the view, or interpolate the view.

In another aspect of the present disclosure, to mask the texture to generate the first mask, the graphical processing unit may mask a second plurality of image tiles absent from the plurality of image tiles.

In another aspect of the present disclosure, the graphical processing unit may generate a texture pyramid based on one or more of rendering parameters or a size of the image.

In another aspect of the present disclosure, to store the texture, the graphical processing unit may convert the texture based at least in part on toroidal wrapping.

In another aspect of the present disclosure, the graphical processing unit may clip the image to generate the view of the region of interest.

In another aspect of the present disclosure, the central processing unit may include a first portion of an image renderer and the graphical processing unit may include a second portion of the image renderer.

In another aspect of the present disclosure, the region of interest may be a first region of interest. Further, the central processing unit may determine a modification from the first region of interest of the image to a second region of interest of the image. Further, the central processing unit may identify, using a texture map, a second plurality of image tiles of the second region of interest. The second plurality of image tiles may be absent from the texture. Further, the graphical processing unit may obtain the second plurality of image tiles from the central processing unit over the bus. The graphical processing unit may process the second plurality of image tiles. Further, the graphical processing unit may update the texture to generate an updated texture based on processing the second plurality of image tiles and the texture. Further, the graphical processing unit may store the updated texture. Each of the updated texture and the texture may correspond to a first set of shared image tiles.

In another aspect of the present disclosure, to cause display of the view corresponding to the region of interest of the image based at least in part on the first mask, the graphical processing unit can cause display of a first view corresponding to a first resolution. Further, the graphical processing unit can cause display of an update to the view corresponding to a second resolution.

In another aspect of the present disclosure, the plurality of image tiles may correspond to a first plurality of image tiles. Further, the central processing unit may determine that a second plurality of image tiles are utilized as a cache of the graphical processing unit. The first plurality of image tiles may include the second plurality of image tiles and a third plurality of image tiles. To obtain the plurality of image tiles from the central processing unit over the bus, the graphical processing unit can obtain the third plurality of image tiles from the central processing unit.

In another aspect of the present disclosure, to obtain the plurality of image tiles from the central processing unit over the bus, the graphical processing unit can obtain a singular upload of the plurality of image tiles.

In another aspect of the present disclosure, the graphical processing unit can utilize a plurality of textures as a plurality of objects of the cache of the graphical processing unit.

In another aspect of the present disclosure, the region of interest may be a first region of interest. Further, the central processing unit may determine a modification from the first region of interest of the image to a second region of interest of the image. The central processing unit may identify, using a texture map, a second plurality of image tiles of the second region of interest. The second plurality of image tiles may be absent from the texture. The graphical processing unit may obtain the second plurality of image tiles from the central processing unit over the bus. The second plurality of image tiles may be based on detecting a user operation. Further, the graphical processing unit may process the second plurality of image tiles. Further, the graphical processing unit may update the texture to generate an updated texture based on processing the second plurality of image tiles and the texture.

In another aspect of the present disclosure, the graphical processing unit can upload the plurality of image tiles to the texture. Further, the graphical processing unit can obtain the plurality of image tiles from the texture. The graphical processing unit may utilize the plurality of image tiles for a subsequent operation without reobtaining the plurality of image tiles from the second hardware processing unit based at least in part on the texture corresponding to the object of the cache.

In another aspect of the present disclosure, the texture may correspond to an implicit cache of the graphical processing unit and/or a visualization object of the graphical processing unit.

In another aspect of the present disclosure, the cache of the graphical processing unit and the memory circuit of the graphical processing unit may be different data storage (e.g., different, separate, and/or distinct data stores). Further, the memory circuit and/or the cache of the graphical processing unit may be controlled by and/or physically embedded in the graphical processing unit and/or a memory circuit and/or a cache of the central processing unit may be controlled by and/or physically embedded in the central processing unit.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
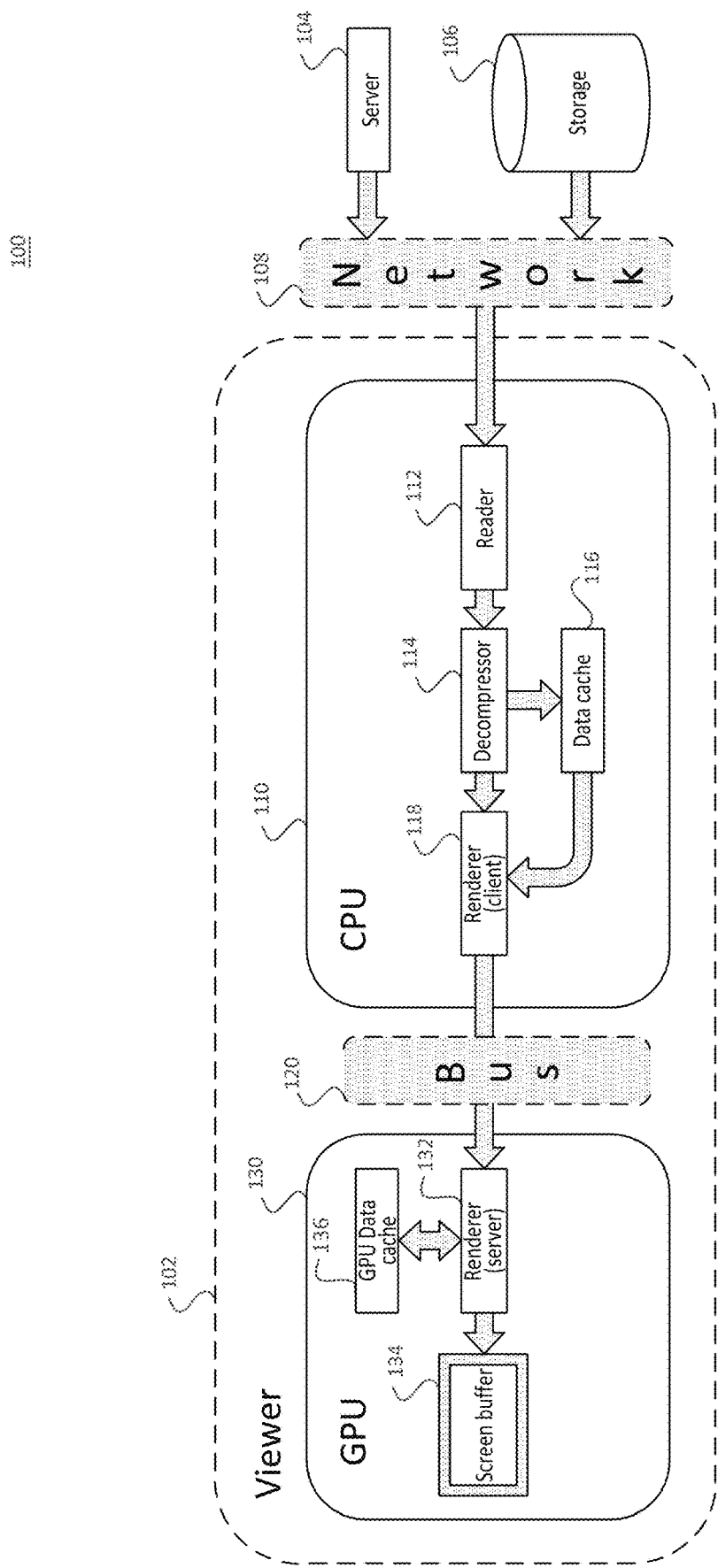
FIG. 1 is a schematic diagram of one example of an image viewer with a GPU-based rendering pipeline.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

GPUs can be used for rendering tasks in high performance graphics applications. For example, rendering tasks can be associated with image data received from an imaging device (e.g., a medical scanner, a camera, a satellite, mobile devices, tablets, laptops, wearable electronics, or any other imaging device) and associated with a particular visual image analysis (e.g., medical diagnosis, examination, tracking and observing, etc.). However, when rendering large datasets (for instance, PI images), traditional GPU-based approaches suffer from a number of drawbacks.

The amount of data transferred from CPU memory to a GPU for each frame may depend on the image resolution and, as the image resolution increases, the amount of data being transferred can also increase. For example, when using a 4 k monitor with display resolution 3840×2160, to visualize a particular image, 24 megabytes of data are transferred from CPU memory to the GPU for each frame of the image and, when using an 8 k monitor with display resolution 7680×4320, to visualize a particular image, 95 megabytes of data are transferred from CPU memory to the GPU for each frame of the image. Therefore, the rendering of larger images (e.g., images corresponding to a greater display resolution) can result in a larger amount of data to be transferred from the CPU memory to the GPU. For instance, PI images used in medical imaging applications are large in size, and thus the transfer of PI image data is time consuming and per frame transferring is unacceptably slow. Accordingly, a smooth rendering of PI images is not possible on hi-resolution monitors. Moreover, in certain applications images are located remotely, and thus suffer from slow access. Thus, a normal rendering is inhibited by the time for transferring of necessary data for rendering tasks.

Provided herein are GPU-based rendering pipelines for tiled images. In certain embodiments, a rendering pipeline includes a GPU coupled to a CPU over a bus. For example, the GPU, the CPU, and the bus are hardware components. The imaging system can include the GPU-based rendering pipeline to render the image to be viewed via a viewer. The viewer may be a software application that corresponds to a plurality of software components. The CPU and/or the GPU may run (e.g., execute) one or more of the plurality of software components. Illustratively, the software components of the viewer that the CPU is running may be referred to as a component of the CPU and the software components of the viewer that the GPU is running may be referred to as a component of the GPU. The GPU may provide a graphics API to render the image. A component of the CPU transfers image tiles of a region of interest (ROI) of an image to the GPU from a component of the CPU (for instance, from a cache, a decompressor, a CPU renderer portion, or any other component) over the bus. For example, a CPU renderer can obtain and transfer a set of tiles to the GPU and control the GPU for the creation of textures, pixel buffer objects, masking, transformation matrices, viewpoint coordinates, etc. The GPU processes the image tiles to generate a texture (e.g., a texture object) implemented with toroidal wrapping. The texture can be utilized as a visualization object and a cache simultaneously, and thus is a multi-purpose object. Accordingly, although the GPU may not have or include an explicit cache, the texture with toroidal wrapping serves as an implicit cache. It will be understood that in some embodiments the GPU may have an explicit cache. The texture is stored as a level of a texture pyramid, and is masked during rendering to aid in displaying a view corresponding to the ROI of the image. The texture pyramid may be a set of textures with each texture stored as a corresponding level of the texture pyramid.

Accordingly, the CPU operates with software that serves to decompress incoming image data and store it in a local cache for use by a component of the GPU. Excluding any redundancy, image tiles representing the image data is transferred to a component of the GPU for processing and are used to generate a texture pyramid with a toroidal wrapping. By implementing the texture with wrapping, the texture is utilized as a cache object, and data that was uploaded to the texture can be reused in place without a re-uploading.

Thus, the implementation of the texture serves to overcome limitations in existing GPU-based rendering pipelines. In particular, such a texture serves as both an image object and a cache object. Accordingly, tiles that were uploaded to the GPU from previous rendering tasks can be reused.

In certain implementations, the texture is stored within a texture pyramid that includes a thumbnail texture image at a top or upper level, a high resolution texture image at a bottom or lower level, and one or more intermediate texture image levels between the top level and the bottom level. Each level of the texture pyramid can be presented by a tiled texture, and in certain implementations the dimension of the texture are exceeded dimensions of the view and aligned to a tile size.

Using such a texture pyramid provides a number of advantages. For example, in a case where a tile is missed (by any reason, such as the tile still being downloaded), the renderer can display an upper level in the view pyramid. Thus, the rendered need not be blocked by any missed tiles. Moreover, even if all tiles are missed, the renderer can still display a thumbnail. Although such an image can have blurring, such blurring is momentary until all tiles have come, and thus a user action need not be interrupted. Accordingly, in a medical imaging application, a user can freely change to ROI (for instance, during zooming and/or panning) with little to no perceived delay.

In certain implementations, the rendering pipeline includes a texture map containing parameters of tiles uploaded to a texture. Such a texture map is synchronized with the texture, and used to identify image tiles that should be loaded from software components that the CPU is running and processed by the GPU.

Thus, generally described, the present disclosure relates to an imaging system that renders an image to be viewed via a viewer. The imaging system can include a graphical processing unit ("GPU") and a central processing unit ("CPU") that can each run (e.g., operate, execute) software components to perform one or more operations to render the image to be viewed via the viewer. The viewer corresponds to a software application, which can be a web application or native code, that runs on the GPU and CPU to provide rendering. The GPU and the CPU can each include various computational characteristics or capabilities (e.g., cores, throughput, latency, etc.). The GPU and the CPU may each correspond to a different set of characteristics or capabilities for running software components associated with the software application. For example, the CPU may have less cores than the GPU and a lower latency than the GPU while the GPU may have a higher throughput than the CPU. As a result, the GPU and the CPU may be ideal for performing certain tasks. For example, when running a particular software component, the CPU may perform serial processing at a higher level (e.g., at a better efficiency, at a better speed, etc.) and the GPU may perform parallel processing and/or tasks that include a large number of operations at a higher level (e.g., at a better efficiency, at a better speed, etc.). Further, a software component that is being run by the CPU may not be suitable for complex operations like rotation or advanced interpolation and, while, a software component that is being run by the GPU may be more suitable for these complex operations, it may be disadvantageous to transmit large amounts of data from a component of the CPU to a component of the GPU. The image rendering process may include a plurality of operations, each of which may be advantageously performed by a GPU or a component of the CPU. Thus, it may be advantageous to perform the image rendering process via a pipeline that includes a component of a CPU to prepare and upload data to a component of the GPU and the component of the GPU renders the image according to the CPU command.

The present disclosure further relates to an imaging system that includes an image renderer that is divided into multiple portions (e.g., a client image renderer portion and a server image renderer portion). The image renderer can be configured in a client-server architecture such that a portion of the image renderer corresponds to a client image renderer portion and another portion of the image renderer corresponds to a server image render portion. The client image renderer portion can be located at the CPU side of the viewer and the server render portion can be located at the GPU side of the viewer. For example, the image system can include a first portion of the renderer (e.g., a CPU renderer portion or a client renderer portion) that performs a first portion of the rendering of the image and a second portion of the renderer (e.g., a GPU renderer portion or a server renderer portion) that performs a second portion of the rendering of the image. As described herein, the use of a renderer that is divided into multiple portions where the multiple portions of the image renderer can limit the computations required by the first portion of the renderer (e.g., the client renderer portion). Further, the use of an image renderer that is divided into multiple portions can reduce the quantity and complexity of operations that the first portion of the renderer performs and can reduce the amount and the quantity of data that is transmitted from the first portion of the renderer to a second portion of the renderer. By performing a first set of rendering operations by the first portion of the renderer and a second set of rendering operations by the second portion of the renderer, the imaging system can be optimized in order to provide an efficient and powerful imaging system. It will be understood that the first portion of the renderer may be referred to illustratively as a CPU renderer, a first renderer, a client renderer, or a client side renderer and the second portion of the renderer may be referred to illustratively as a GPU renderer, a second renderer, a server renderer, or a server side renderer.

As described herein, an imaging system (e.g., an imaging system of a medical device) can be used to capture an image. Further, the imaging system can obtain image data associated with the image. The image data can correspond to two-dimensional image data. The imaging system can store the image data in a tiled format. For example, the imaging system can generate a plurality of tiles from the image data and each tile of the plurality of tiles may correspond to a particular section of the image data, and, therefore, the image. Further, the tiled format of the image data may correspond to rows and/or columns of squares or rectangular tiles. Each tile may further correspond to a plurality of image pixels. The imaging system can include one or more software components run by (e.g., run on) the CPU and a graphics API provided by the GPU to process and render the image data for viewing via a viewer. The set of software components that the CPU is running can include a reader, a decompressor, a data cache, and/or a portion of the renderer. The reader can obtain compressed tiles and other image data. The decompressor can decompress the tiles. The data cache can store the decompressed tiles for potential reuse by the CPU renderer portion. The GPU renderer portion can compose a selection of tiles and clip the selection of tiles based on a desired region of interest. The GPU can include a screen buffer that obtains the clipped selection and causes the clipped section to be displayed.

In many conventional cases, implementing an imaging system that is based entirely on a conventional GPU rendering design may not provide satisfactory results in particular circumstances or for particular users. An imaging system that is based entirely on CPU rendering design (e.g., with a component of a CPU performing the entire rendering process) may not be suitable for complex operations like rotation or advanced interpolation. For example, the CPU based renderer may be unable to perform advanced interpolation operations on the image data prior to transmitting the image data to the GPU. Further, an imaging system with a CPU based renderer may render each frame of image data prior to transmitting each frame of image data to the GPU. Such rendering of each frame of image data prior to transmitting the frame of image data can result in performance issues. Further, the bus for transmitting data between a component of the CPU and a component of the GPU may have a limited data capacity and may not be capable of passing previously rendered image data between the component of the CPU and the component of the GPU. An imaging system with a GPU based rendering process may transmit image data from a component of the CPU to a component of the GPU for each frame. Such transmission of the image data from a component of the CPU to a component of the GPU can result in performance issues as the entire dataset of the image data may be transferred from the component of the CPU to the component of the GPU.

As imaging systems proliferate, the demand for faster and more efficient image rendering has also increased. The present disclosure provides a system for rendering the image with significant advantages over prior implementations. The present disclosure provides systems and methods that enable a reduction in the computations by the GPU renderer portion and the computations by the CPU renderer portion. Further, the present disclosure provides systems and methods that enable a reduction in the amount of data transmitted between the CPU and the GPU and enable an optimized rendering algorithm for dynamically loading images during a rendering process.

As described herein, a CPU may be used for a first portion of a rendering pipeline responsible for preparing data and uploading data to the GPU and a GPU may be used for a second portion of the rendering pipeline responsible for a final rendering. The CPU and the GPU are parts of an imaging system. The imaging system includes an image viewer that can display an image for a user of the imaging system. Upon initialization of the imaging process, the imaging system may obtain imaging data (e.g., a collection of imaging tiles). The imaging system can obtain the imaging data from a data storage, a system, a dedicated server, etc. The imaging system can obtain the imaging data over a network (e.g., a local network, a cloud service, etc.).

The imaging system may cause a first view (e.g., region of interest) to be displayed based on a first set of received imaging data. Further, the imaging cause may modify the first view to be displayed to generate a second view. As described herein, a component of the CPU may read the imaging data obtained by the imaging system. The imaging data can be a collection of imaging tiles that make up the view. Based on the component of the CPU reading the imaging data, a component of the CPU can decompress the imaging data to generate a set of decompressed collection of imaging tiles. Further, a component of the CPU can store the decompressed collection of imaging tiles in a data cache. A component of the CPU can utilize a GPU application programming interface ("API) to generate textures corresponding to the imaging data. Each texture can correspond to a collection of image data (e.g., a particular collection of imaging tiles). A component of the CPU can further generate a texture pyramid based on the textures corresponding to the image data. Each texture can correspond to a particular level of the texture pyramid. For example, the texture pyramid can have a plurality of levels and each level of the texture pyramid may correspond to a particular texture. Further, each texture can correspond to a particular resolution associated with the texture pyramid. For example, a first texture may correspond to a first, initial resolution texture image and a first level of the pyramid and a second texture may correspond to a second level of the pyramid. A component of the CPU may determine a first set of imaging tiles of the particular texture that are stored in the data cache and a second set of imaging tiles of the texture that are not stored in the data cache. Further, a component of the CPU can provide the tiles to a component of the GPU via a bus. A component of the CPU can provide the tiles by asynchronously uploading each tile of the set of imaging tiles as a pixel buffer object ("PBO"). The PBOs can enable transfer of pixel data to a component of the GPU. In some embodiments, the component of the CPU can provide the set of image tiles without PBOs to the component of the GPU. For example, the component of the CPU can sequentially upload the set of image tiles to the component of the GPU.

As described herein, in order to perform additional processing on the image data, a component of the GPU can receive the set of imaging tiles from a component of the CPU. Further, a component of the GPU can process the set of imaging tiles obtained from a component of the CPU. Based at least in part on the set of imaging tiles, a component of the GPU can generate a texture. The texture can be an object within the GPU that contains pixels. Further, the texture can include a plurality of tile coordinates. For example, a first tile coordinate of the texture may correspond to an x-axis associated with the texture and a second tile coordinate of the texture may correspond to a y-axis. The texture can include at least one wrapped tile coordinate of the plurality of tile coordinates associated with the texture. For example, the texture can include a plurality of tile coordinate wrapped using toroidal wrapping. Further, the texture may correspond to or serve as an object of a cache of the GPU. For example, a component of the GPU can utilize the texture as an object of a cache of the GPU. A component of the GPU can store the texture as a first level of a texture pyramid. A component of the GPU can generate a mask based on masking the texture. Masking the texture may be based at least in part on imaging tiles that have not been uploaded from a component of the CPU to a component of the GPU. Further, a component of the GPU can cause a view to be displayed based at least in part on the mask and the texture. In some embodiments, a component of the GPU can clip the region of interest in order to emphasize the region of interest.

Further, as described herein, in order to modify the image data (e.g., to modify the view that a component of the GPU causes to be displayed), the central processing unit may determine a modification from an initial region of interest of the image to a second region of interest of the image. The modification may include a user modification of the image and/or the region of interest. For example, the modification may include one or more of a pan, a zoom, a rotation, or any other interaction with the image. Based on the modification of the image and/or the region of interest, a component of the CPU can identify, using a texture map, a second plurality of image tiles of the second region of interest. The texture map can identify a map of a first texture image. The texture map can further identify a map of a second texture image corresponding to the second plurality of image tiles of the second region of interest. Based on the first texture image and the second texture image, the texture map can identify differences between the first texture image and the second texture image. A component of the CPU can identify the differences between the first texture image and the second texture image as a third plurality of image tiles. The third plurality of image tiles may correspond to image tiles included in the second plurality of image tiles and absent from the first plurality of image tiles. Thus, the third plurality of image tiles identifies image tile differences between the second plurality of image tiles and the first plurality of image tiles. Based on the component of the CPU identifying the third plurality of image tiles, a component of the CPU can transmit the third plurality of image tiles over the bus to a component of the GPU. Based on receiving the third plurality of image tiles, a component of the GPU can process the third plurality of image tiles and generate a second texture corresponding to the first plurality of image tiles. In some embodiments, the second texture may correspond to an update to the texture. In other embodiments, the second texture and the texture may correspond to different levels of the texture pyramid and may correspond to different resolutions. Further, a component of the GPU can store the second texture as a level of the texture pyramid. In some embodiments, a component of the GPU can store the second texture as an update to the first level of the texture pyramid. In other embodiments, a component of the GPU can store the second texture as a second level of the texture pyramid. A component of the GPU can, based on the second texture, mask the second texture to generate a second object. Further, a component of the GPU can cause display of the view based at least in part on the second mask and the texture pyramid. The display of the view may correspond to the modification by the user. Further, the display of the view may correspond to a second region of interest. The use of the GPU and the CPU in the image rendering process can increase the efficiency and the speed of the imaging system and/or the image process. Further, an added benefit of the rendering process that includes the GPU and the CPU is a fluid imaging experience for a user of the imaging system. For example, the user of the imaging system may view, via the display of the imaging system, a first image that is updated periodically to cause the display of an updated image such that the user views a dynamically updated image.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well known features may be omitted or simplified in order not to obscure the examples being described.

GPU-Based Rendering Pipelines for Tiled Images

FIG. 1 illustrates an example imaging system 100 with various components to render an image, according to some embodiments. The imaging system 100 such as the one illustrated in FIG. 1 is designed to use a client server renderer during the imaging process in order to improve the efficiency and efficacy of the imaging process. The imaging system 100 can include a viewer 102 in communication with a server 104 and/or data storage 106. The viewer 102 can be in communication with the server 104 and/or the data storage 106 over a network 108.

In the illustrated embodiment, the viewer 102 includes a CPU 110 and a GPU 130 in communication over a bus 120. The bus 120 can correspond to a wired bus (e.g., a PCI express bus). The CPU 110 and/or the GPU 130 may execute one or more software components associated with the viewer 102. The CPU 110 can execute software components of the viewer 102 such as a reader 112, a decompressor 114, a data cache 116, and a first portion of the renderer 118. Illustratively, one or more of the reader 112, the decompressor 114, the data cache 116, or the first portion of the renderer 118 may not be separate components and may illustrate various functionality of the CPU 110. The GPU 130 can execute software components of the viewer 102 such as a second portion of the renderer 132, and a screen buffer 134. The GPU 130 can further utilize a texture as a GPU data cache 136. Illustratively, one or more of the second portion of the renderer 132 or the screen buffer 134 may not be separate components and may illustrate various functionality of the GPU 130.

The viewer 102 can be or include an image viewer. The viewer 102 can include a software application. For example, the viewer 102 may correspond to a web viewer application or a native code application. The viewer 102 may include components of the CPU 110 (e.g., the reader 112, the decompressor 114, and the data cache 116), the first portion of the renderer 118, and/or the second portion of the renderer 132. The viewer 102 can utilize a screen buffer to transfer a rendered view (e.g., an image) to a display device (e.g., a monitor). The viewer 102 can receive a plurality of image data, process the plurality of image data, and cause a corresponding view to be displayed. The viewer 102 may further operate in combination with a display (e.g., a screen) to display the view. For example, the viewer 102 can cause an image to be rendered on a monitor, an LCD screen, an LED screen, or any other type of display on which an image can be displayed. In some embodiments, the viewer 102 may transmit the image to a separate display (through a wireless or a wired display). The viewer 102 may, therefore, cause the view to be displayed for viewing by a user of the imaging system 100. Further, the viewer 102 may cause additional data about the view to be displayed. For example, the viewer 102 may indicate metadata, patient data, geolocations, annotations, analysis results, etc. Further, the viewer 102 may indicate a source of the view, one or more objects in the view, a time of the view, or any other information about the image frame. The viewer 102 may receive additional data about the image frame from one or more of the server 104 and/or the data storage 106.

The server 104 can refer to computing devices or systems that compute, assemble, store, correlate, or otherwise process information. The server 104 can include, but is not limited to, a personal computer, a server computer, a cloud service, a laptop device, a multiprocessor system, a microprocessor-based system, a network PC, a minicomputer, a mainframe computer, or a distributed computing environment that includes any of the above systems or the like. In certain implementations, the server 104 provides tiles to the viewer 102.

With continuing reference to FIG. 1, the data storage 106 can maintain imaging information for the viewer 102 and/or the server 104. In certain implementations, the data storage 106 provides an image file to the viewer 102 over the network 108. The data storage 106 can store information about image data previously transmitted to the viewer 102, image data to be transmitted to the viewer 102, or any other image data. Further, the data storage 106 can store the image data as one or more variables. For example, the data storage 106 can store the image data as a plurality of pixel values. In some embodiments, the viewer 102, the server 104, and/or the data storage 106 can be in communication (e.g., wired and/or wireless communication) with each other. The server 104 can perform data compression on the received/stored image data in order to provide compressed image data to the viewer 102 and store the compressed data in the data storage 106.

The components of the imaging system 100 may communicate over a network 108. For example, the server 104 and the viewer 102 may communicate over the network 108. Further, the data storage 106 and the viewer 102 may communicate over the network 108. In some embodiments, the CPU 110 may include one or more components that communicate over the network 108. The network 108 illustratively represents a distinct network environment. In one embodiment, the network 108 is a virtualized network logically implemented by a physical network, which includes physical network hardware such as routers, switches, network address translators (NATs), and so on, as well as the physical connections among the devices. For example, the network 108 may represent a virtual private network environment. The network 108 may include any viable communication technology, such as wired and/or wireless modalities and/or technologies. The network 108 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. The network 108 may include, and/or may or may not have access to and/or from, the Internet.

The viewer 102 may serve as software that controls a CPU 110 and a GPU 130 for rendering and/or processing the image data received from the server 104 and/or the data storage 106. Each of the CPU 110 and the GPU 130 may include one or more components to perform at least a portion of the rendering and/or processing of the image. In order to assist in the rendering and/or processing of the image, the CPU 110 includes a first data cache 116 and a first portion of the renderer 118 and the GPU 130 includes a second portion of the renderer 132. The CPU 110 can further include a reader 112 and a decompressor 114 and the GPU 130 can further include a screen buffer 134. It will be understood that the CPU 110 and the GPU 130 can include more, less, or different components.

A component of the CPU 110 may receive image data from one or more of the server 104 and/or the data storage 106 via the network 108. The image data may correspond to a plurality of image tiles that correspond to a desired image. For example, the image data may correspond to an image taken by a medical device and provided to the viewer 102 through the server 104 and the network 108. Further, the image data may correspond to a plurality of fields and corresponding field values or a plurality of data points.

The reader 112 can receive the image data and perform initial processing on the image data. The initial processing of the image data may include reading the compressed image tiles and other data corresponding to the image data. Based upon reading the compressed image tiles and other data corresponding to the image data, the reader 112 can transmit the read compressed image tiles to the decompressor 114. The decompressor 114 can receive the read compressed image tiles and decompress the read compressed image tiles. Further, the decompressor 114 can generate decompressed image tiles. In order to decompress the read compressed image tiles, the decompressor 114 can perform one or more decompression operations. For example, the decompressor 114 can perform decompression of joint photographic experts group ("JPEG") image format (e.g., JPEG, JPEG2000, or any other lossy compression algorithm), neural image decompression, adaptive interpolation decompression, lossless decompression, or any other type of decompression.

A component of the CPU 110 can further store the decompressed image tiles in a data cache 116. The component of the CPU 110 may store the decompressed image tiles for subsequent image rendering. For example, the component of the CPU 110 can store the decompressed image tiles such that subsequent compressed image tiles corresponding to the decompressed image tiles may not be decompressed and the component of the CPU 110 may instead access the prior decompressed image tiles. The decompressor 114 can transmit the decompressed image tiles to the first portion of the renderer 118. The first portion of the renderer 118 may request the image tiles from the data cache 116. In the event that the image tiles are stored in the data cache 116, the first portion of the renderer 118 may receive the image tiles from the data cache 116. In the event that the image tiles are not stored in the data cache 116, the first portion of the renderer 118 may request the image tiles from the decompressor 114. The decompressor 114 may transmit the decompressed image tiles that were not previously stored in the cache 116. For example, the decompressor 114 can determine decompressed image tiles stored by the cache 116 and may transmit the decompressed image tiles not stored by the cache to the first portion of the renderer 118. Therefore, the first portion of the renderer 118 can receive from the cache 116 and the decompressor 114, the full set of decompressed image tiles for a given view, region of interest, perspective, or interpretation of the image. The first portion of the renderer 118 can perform a first portion of image processing and/or rendering on the set of decompressed image tiles. Further, the first portion of the renderer 118 can transmit the decompressed image tiles not previously stored by the cache 116 to a component of the GPU 130 via the bus 120. In some embodiments, the first portion of the renderer 118 can transmit the full set of decompressed image tiles to the component of the GPU 130 via the bus 120.

A component of the GPU 130 can receive the decompressed image tiles from a component of the CPU 110 at a second portion of the renderer 132 of the GPU 130. The second portion of the renderer 132 can receive new decompressed image tiles from the second portion of the renderer 132 of the CPU 110. Further, the second portion of the renderer 132 can receive previously stored decompressed image tiles from a component of the GPU 130. In some embodiments, in rendering a first set of image data, the component of the CPU 110 may transfer the full set of image data to the second portion of the renderer 132 of the GPU 130.

With continuing reference to FIG. 1, the second portion of the renderer 132 can utilize the texture as the cache 136 of the GPU 130. Thus, the cache 136 need not be explicit, but rather the texture can be utilized as an implicit cache. The texture can correspond to a texture map and may indicate stored image tiles. Further, the cache 136 of the GPU 130 can correspond to multiple textures corresponding to the same region of interest. As subsequent sets of image data are received, a component of the CPU 110 can transfer partial sets of image data to the second portion of the renderer 132 of the GPU 130 and the second portion of the renderer 132 of the GPU 130 can obtain additional sets of image data. In order to determine previously stored image data, a component of the GPU 130 can access the texture. Based on receiving the image data from the first portion of the renderer 118, the second portion of the renderer 132 can perform additional rendering operations. For example, the additional rendering operations may include one or more of panning an image, zooming an image, interpolating an image, rotating an image, or otherwise modifying an image. The second portion of the renderer 132 can perform the additional rendering operations and provide the rendered image data to a screen buffer 134 of the GPU 130.

The screen buffer 134 (e.g., a frame buffer, a video buffer, an off-screen buffer, etc.) includes data storage storing data representing the pixels. The screen buffer 134 can include video (e.g., GPU) memory that is visible on a screen. In some embodiments, the GPU 130 may correspond to an off-screen buffer that provides the rendered image data to CPU memory for further processing (e.g., image analysis). The screen buffer 134 can further include a bitmap. The screen buffer 134 can use the bitmap in order to drive the screen. The screen buffer 134 can correspond to screen buffer circuitry that converts the bitmap into an image signal or video signal for display on the screen.

In certain embodiments the imaging system 100 can be or include a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Figure 2:
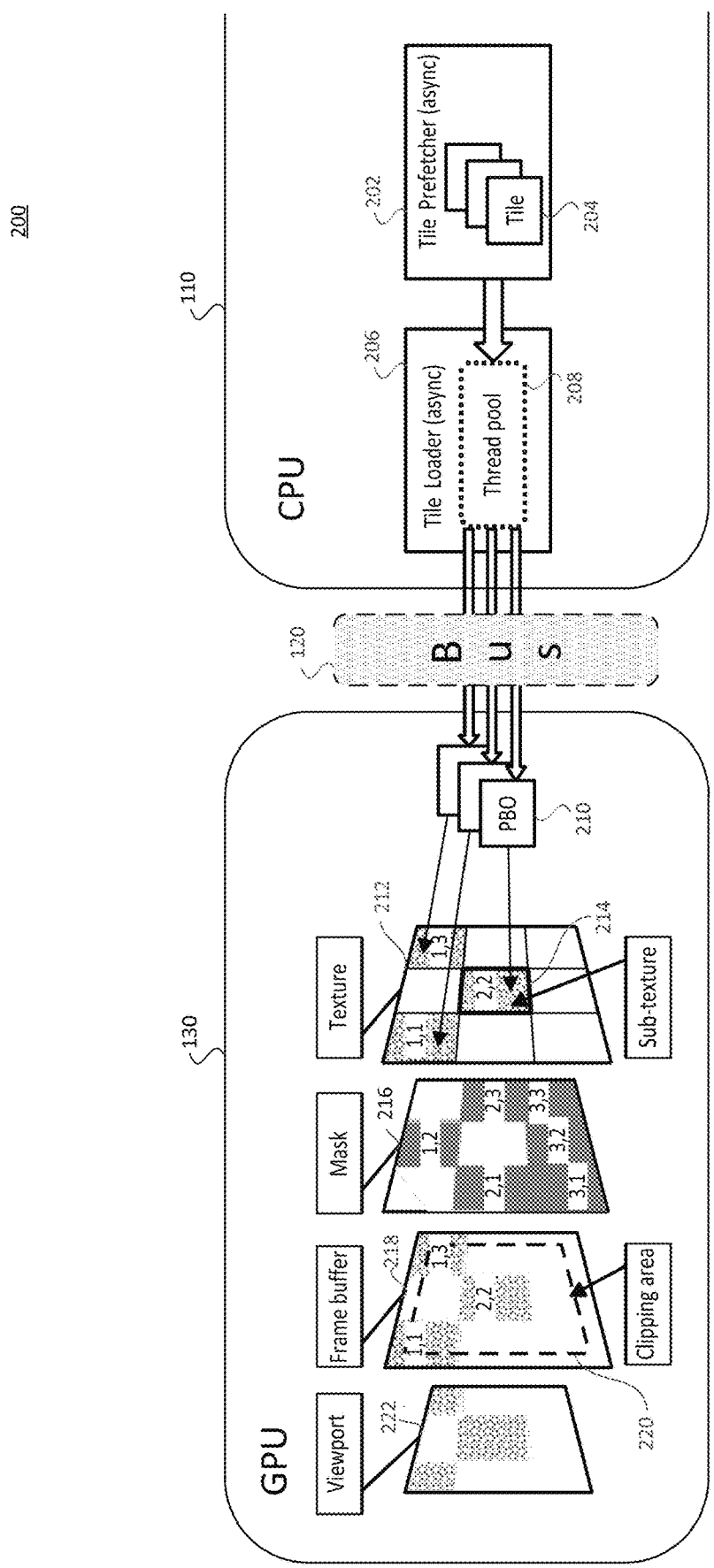
FIG. 2 is a schematic diagram of one example of a GPU-based rendering pipeline.

FIG. 2 illustrates an example imaging system 200 with various components to render an image, according to some embodiments. The imaging system 200 can include a CPU 110 and a GPU 130 that each include one or more components for rendering the image in parallel using picture buffer objects (PBOs), in this embodiment. A viewer may control both the CPU 110 and the GPU 130 to cause the image to be displayed for viewing by a user. The CPU 110 and the GPU 130 may communicate over a bus 120 via components of the CPU 110 and the GPU 130. Each of the CPU 110 and the GPU 130 may include one or more components to perform one or more operations. The CPU 110 can include a tile prefetcher 202 in order to obtain image tiles. The CPU 110 can further include a tile loader 206 in order to load the image tiles and transmit the image tiles to a component the GPU 130.

The tile prefetcher 202 can obtain a plurality of tiles 204. The tile prefetcher 202 can asynchronously obtain the plurality of tiles 204 from data storage and/or a server. Further, the tile prefetcher 202 can obtain the plurality of tiles 204 based on the plurality of tiles 204 being uploaded to the image system 200. In some embodiments, the tile prefetcher 202 can periodically obtain the plurality of tiles 204. Further, upon obtaining the plurality of tiles 204, the tile prefetcher 202 can provide the plurality of tiles to the tile loader 206. The tile loader 206 can request a set of tiles of the plurality of tiles 204 from the tile prefetcher 202 and, in response, the tile prefetcher 202 can transmit, in parallel, the set of tiles of the plurality of tiles 204 to the tile loader 206. In some embodiments, the tile prefetcher 202 can transmit, in parallel, the full plurality of tiles 204 to the tile loader 206. Upon obtaining the set of tiles, the tile loader 206 can load the set of tiles as a thread pool 208 for transmission to a component of the GPU 130. For example, the thread pool 208 can include a set of asynchronously running threads that each transmits tiles to PBO buffers via the bus 120 to a component of the GPU 130.

A component of the GPU 130 can receive the set of tiles as a set of PBOs 210. Each PBO of the set of PBOs 210 can include an array of bytes. Further, each PBO can correspond to a set of stored pixel data. Each PBO of the set of PBOs 210 may enable asynchronous pixel transfer operations. Further, the component of the GPU 130 and a component of the CPU 110 can use the set of PBOs 210 to perform pixel transfers between the component of the GPU 130 and the component of the CPU 110. In order to generate the set of PBOs 210, the component of the GPU 130 can copy image data received from the component of the CPU 110 to the set of PBOs 210. The asynchronous pixel transfers enables a set of PBOs 210 to be periodically received by the component of the GPU 130 such that the component of the GPU 130 can perform rendering on each set of PBOs 210. The use of the set of PBOs 210 enables the component of the GPU 130 to directly obtain the set of PBOs 210 and generate a texture based on the set of PBOs 210.

Although the illustrated embodiment includes the PBOs 210 to facilitate parallel processing, the teachings herein are also applicable to rendering pipelines that omit PBOs. For example, in another embodiment, a component of the GPU is implemented to directly upload an image tile to texture without the use of a PBO.

With continuing reference to FIG. 2, based on the set of PBOs 210, a component of the GPU 130 can generate a texture 212. The texture 212 may include a representation of the image data received by a component of the CPU 110. Further, the texture 212 may correspond to a texture map indicating potential sub-textures. In order to populate the sub-textures, the component of the GPU 130 may obtain a plurality of sub-textures 214. In some embodiments, the component of the GPU 130 may generate the plurality of sub-textures 214 using the set of PBOs 210. Further, the component of the GPU 130 may compile and/or combine the plurality of sub-textures 214 in order to generate the texture 212. In some embodiments, each sub-texture of the plurality of sub-textures 214 may correspond to an image tile of the obtained image data. The texture 212 may therefore include the plurality of sub-textures 214 corresponding to the set of PBOs 210. The texture 212 may also include a second plurality of sub-textures that correspond to data not received by the component of the GPU 130. For example, the second plurality of sub-textures may be empty sub-textures, sub-textures containing extraneous data, sub-textures containing noise, etc. Each sub-texture may correspond to a set of tile coordinates indicating a position in the texture map. For example, each sub-texture may correspond to a tile coordinate along the x-axis and a tile coordinate the y-axis. The sub-texture 1,1 may be a sub-texture in the first column and the first row of the texture map (e.g., the upper left corner of the texture map).

A component of the GPU 130 can further apply a mask 216 to the texture 212. The mask 216 may be based on the plurality of sub-textures obtained by a component of the GPU 130 and the second plurality of sub-textures. The component of the GPU 130 may be used to mask and/or block the second plurality of sub-textures. For example, as seen in FIG. 2, the texture map includes a three by three set of sub-textures and the plurality of sub-textures 214 obtained by the component of the GPU 130 includes sub-texture 1,1, sub-texture 1,3, and sub-texture 2,2 and the mask 216 includes sub-texture 1,2, sub-texture 2,1, sub-texture 2,3, sub-texture 3,1, sub-texture 3,2, and sub-texture 3,3. By applying the mask 216 to the texture 212, the component of the GPU 130 can isolate or focus on the plurality of sub-textures 214 received from a component of the CPU 110. Further, the component of the GPU 130 can apply a mask 216 to isolate invalid sub-textures from projection to the frame buffer 218 or focus on a subset of the plurality of sub-textures 214 received from the component of the CPU 110 for projection to the frame buffer 218. By applying the mask 216 to the texture 212, the component of the GPU 130 can update the texture 212 to mask (e.g., cover, veil, screen, block out, etc.) the sub-textures of the mask 216. In some embodiments, the component of the GPU 130 may not mask the texture 212 and may store the texture 212 without masking the texture 212. It will be understood that the mask 216 may correspond to any area of the texture 212.

A component of the GPU 130 can project the updated texture (e.g., the masked texture) to the frame buffer 218 (e.g., the image buffer) through the mask. The component of the GPU 130 can receive a clipping identifier identifying an amount of the updated texture to be clipped prior to display. The amount of the updated texture to be clipped may correspond to a clipping area 220. Based on the clipping area 220, the component of the GPU 130 can clip the updated texture to generate a clipped texture. In some embodiments, the component of the GPU 130 may not clip the updated texture and may store the updated texture. It will be understood that the clipping area may be any area of the texture 212. Further, a component of the GPU 130 may store the clipped texture in the frame buffer 218 for display. A component of the GPU 130 can cause the clipped texture stored in the frame buffer 218 to be displayed as a viewport display 222 via a viewport. It will be understood that the component of the GPU 130 can cause the clipped texture to be displayed via any type of display.

Toroidal Wrapping

As images are displayed via the viewer of FIG. 1 and/or FIG. 2, the image can be updated from a first region of interest to a second region of interest. In order to update the image from a first region of interest to a second region of interest, the texture image can be wrapped around the texture.

By wrapping the texture image around the texture, the texture is utilized as a cache object, and data that was uploaded to the texture can be reused in place without a re-uploading.

Figure 3:
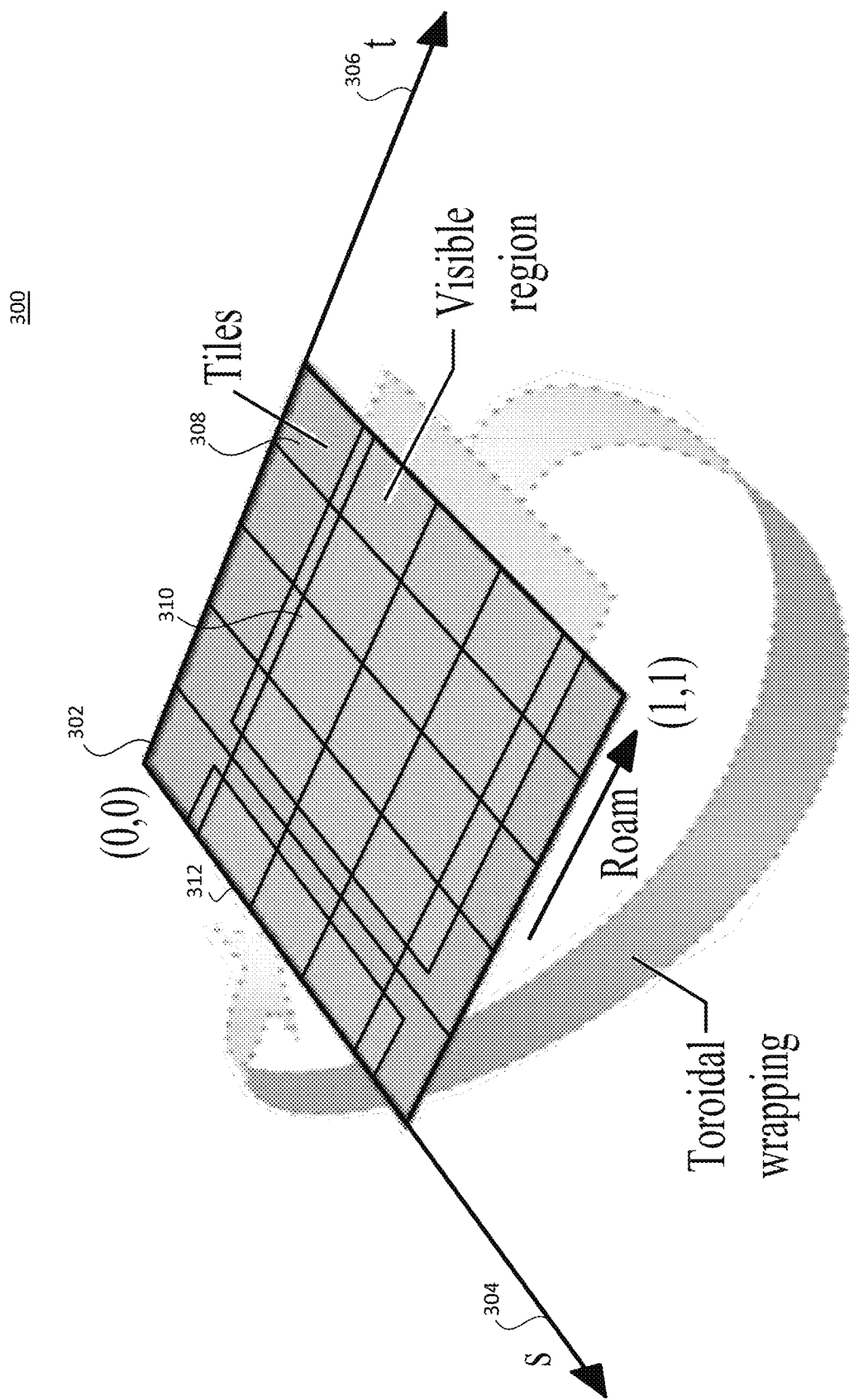
FIG. 3 illustrates one example of toroidal wrapping.

FIG. 3 illustrates such an example wrapping 300 of a texture image 310 using toroidal wrapping. The example wrapping 300 can include a texture 302. The texture 302 may correspond to the texture image 310 and may be located in CPU memory. Further, the texture image 310 can be located in GPU memory and the corresponding texture 302 may correspond to a texture map that can be a common array located in a CPU memory For example, the texture map may be a two-dimensional array containing parameters of all tiles uploaded for a particular texture. The texture 302 may include a first axis 304 (e.g., an s-axis) and a second axis 306 (e.g., a t-axis). A component of the GPU may map a texture image 310 within the texture 302. The texture 302 may identify a first set of sub-textures (e.g., sub-textures included in the texture image 310) and a second set of sub-textures 308 (e.g., sub-textures excluded from the texture image 310). As the image is updated and/or new image data is received, the position of the texture image 310 may update (e.g., change).

As the position of the texture image 310 is modified, a portion 312 of the texture image 310 may wrap around the edge or edges of the texture 302. Further, the portion 312 of the texture image 310 may cross over a border of the texture 302 and wrap around to an opposite border of the texture 302 such that a portion of the texture image 310 wraps around the texture 302. The portion of the texture image 310 may wrap around the texture 302 according to toroidal wrapping. In some embodiments, the portion of the texture image 310 may wrap around the texture 302 according to other wrapping techniques and/or algorithms.

The texture 302 can be stored in memory of the CPU. Further, the imaging system can have GPU memory that is a limited resource. For very large images, the image data can be divided into tiles, and set of tiles constituents of a texture image can be uploaded to the memory of the CPU from disk.

For further details, reference is made to the book "Advanced Graphics Programming Using OpenGL" by Tom McReynolds and David B Lythe (specifically Section 14.6.2 entitled "Paging Images in System Memory").

In the case of a 2D image roam as shown in FIG. 3, the texture image 310 is moving to the right. As the view of the texture image 310 pans to the right, new texture tiles can be added to the right edge of the current portion of the texture and old tiles can be discarded from the left edge. Since texture wrapping can connect these two edges together, the discarding and replacing steps can be combined into a single update step on the tiles that are no longer visible on the left edge, which can wrap around and become visible on the right.

Toroidal Wrapping in a Texture Map

Figure 4:
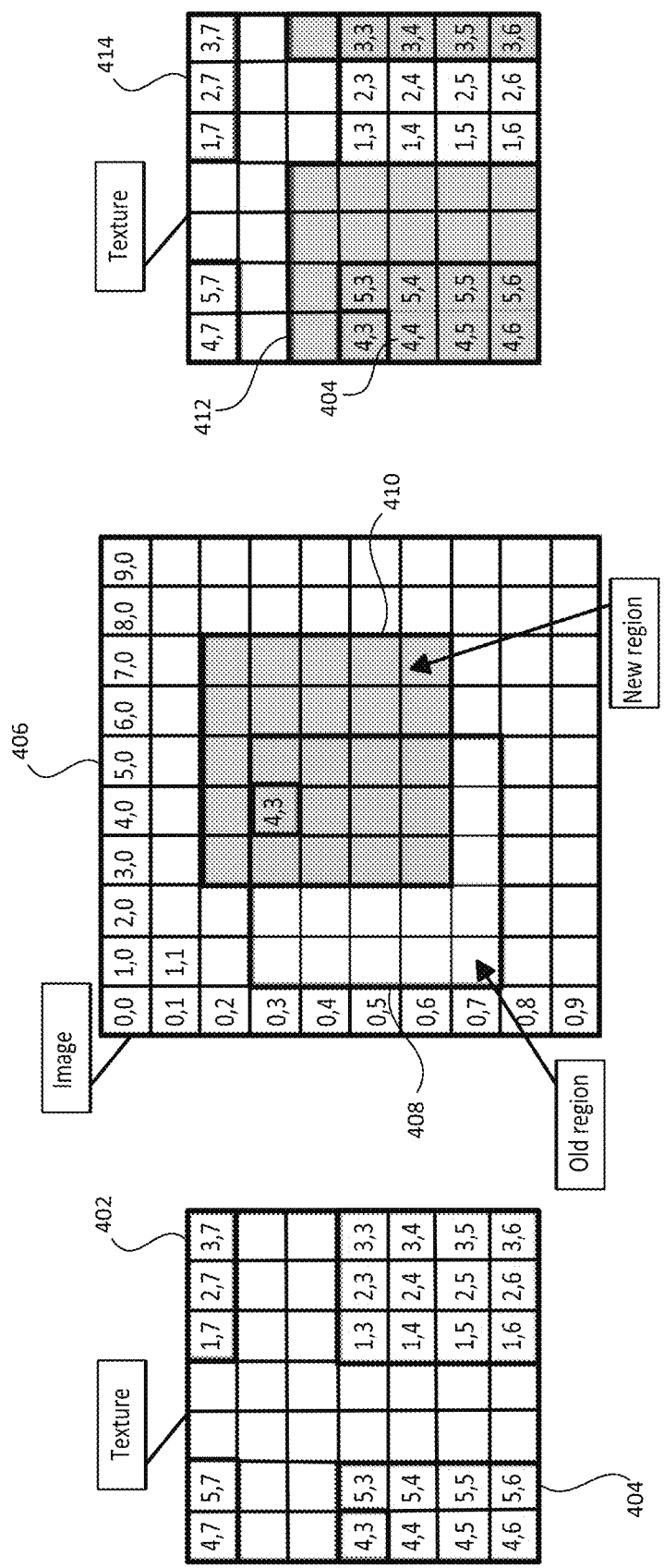
FIG. 4 illustrates one example of toroidal wrapping for image tiles using a texture map.

FIG. 4 illustrates an example wrapping 400 of a texture image (e.g., an ROI of a texture) from a first position to a second position using two-dimensional toroidal wrapping. The viewer of FIG. 1 and/or FIG. 2 can use the example wrapping 400 of FIG. 4 to update the texture. Further, the viewer can use the example wrapping 400 in order to optimize the updating of the texture by determining a minimal amount of the texture for uploading and determining an amount of texture that is already utilized as an object of a cache. The wrapping 400 of FIG. 4 may identify a minimal amount of the texture to be uploaded for a two-dimensional texture map. The texture map can be a two-dimensional array containing parameters of all tiles uploaded for a particular texture and arranged in the same way. The texture map is synchronized with the texture such that the texture map can identify subsequent updates to the texture. For example, the texture map may correspond to an array that contains tiles metadata.

In some embodiments, the wrapping 400 of FIG. 4 may identify a minimal amount of the texture to be uploaded for other texture maps (e.g., a three-dimensional texture map). In order to reduce an amount of the texture to be uploaded (e.g., updated), the viewer can utilize the texture as a cache object. Therefore, the component of the GPU can obtain a portion of the texture from the cache and need not reload the portion of the texture.

In the example of FIG. 4, the texture 402 includes a first texture image 404 (e.g., an ROI). The texture 402 may include tile coordinates in an image coordinate system. Each tile of the plurality of tiles may include and/or correspond to a position within the image presented as column and/or raw indices. For example, the texture 402 includes a first tile in the upper left corner of the texture 402 with the tile coordinates 4,7 and a second tile in bottom right corner of the texture 402 with the tile coordinates 3,6. It will be understood that texture 402 may include any number of tiles and the tiles may include any tile coordinates. The first texture image 404 may include any number of the tiles of the texture 402.

In the example of FIG. 4, the first texture image 404 includes tile 4,3, tile 4,4, tile 4,5, tile 4,6, tile 4,7, tile 5,3, tile 5,4, tile 5,5, tile 5,6, tile 5,7, tile 1,3, tile 1,4, tile 1,5, tile 1,6, tile 1,7, tile 2,3, tile 2,4, tile 2,5, tile 2,6, tile 2,7, tile 3,3, tile 3,4, tile 3,5, tile 3,6, and tile 3,7. It will be understood that the first texture image 404 can include more, less, or different tiles. Tiles of the texture 402 not included in or identified by the texture image 404 may be unused tiles. In some embodiments, the tiles of the texture 402 not included in or identified by the first texture image 404 may be tiles that do not include image data.

The first texture image 404 (e.g., an ROI) may be wrapped around the texture 402. For example, the first texture image 404 is wrapped around the left edge and the bottom edge of the texture 402 in FIG. 4. It will be understood that the first texture image 404 may be wrapped around more, less, or different edges of the texture 402. For example, the first texture image 404 may be wrapped around the upper edge of the texture 402 or the right edge of the texture 402. The texture 402 may be utilized as a cache object in order to store previously rendered tiles.

The first texture image 404 may be modified to a second texture image 412. For example, the first texture image 404 can correspond to an initial ROI while the second texture image 412 can correspond to a new ROI. The change or modification of the first texture image 404 to the second texture image 412 may be a panning (sequential or otherwise), a jumping, or any other alteration of the first texture image 404. In some embodiments, the modification of the first texture image 404 may be a random movement (e.g., a random jumping). The first texture image 404 may include a first position and/or a first region of interest and the new, updated texture image 412 may include a second position and/or a second region of interest. In order to reduce the number of tiles that are reloaded for the new, updated texture, the viewer may use toroidal wrapping.

As discussed above, the first texture image 404 may be wrapped (e.g., toroidally wrapped) around the texture 402. The texture 402 may be utilized as a cache object in order to reduce the number of tiles that are reloaded for the new, uploaded texture image 412. Therefore, the new, uploaded texture image 412 may be based at least in part on the first texture image 404. For example, the first texture image 404 and the second texture image 412 can share one or more tiles.

The tiled image 406 includes an unwrapped first texture image 408 that corresponds to the first texture image 404 when located on the tiled image 406 and an unwrapped second texture image 410 that is an update (for example, change in ROI) to the unwrapped first texture image 408 and corresponds to the second texture image 412 when located on the tiled image 406. The unwrapped first texture image 408 may identify a first region of interest and the unwrapped second texture image 410 may identify a second region of interest. As seen in the tiled image 406, the unwrapped first texture image 408 and the unwrapped second texture image 410 may include a plurality of shared tiles of the tiled image 406. Further, the unwrapped first texture image 408 and the unwrapped second texture image 410 may include a plurality of new tiles of the tiled image 406 that are included in the unwrapped second texture image 410 and not included in the unwrapped first texture image 408. For example, tile 4,3 may be a tile shared by the unwrapped first texture image 408 and the unwrapped second texture image 410. Further, each of the tiles within the unwrapped first texture image 408 and the unwrapped second texture image 410 may be shared tiles and each of tiles not within unwrapped first texture image 408 and within the unwrapped second texture image 410 may be new tiles.

A texture map can be used to determine the tiles that are shared by the first texture image and the second texture image and to identify the tiles that should be reloaded. Thus, the first texture 402 can be updated based on the identified tiles to generate a second texture 414. The second texture 414 can include a first portion of the first texture image 404 that is wrapped around the left edge of the second texture 414 and a second portion of the first texture image 404 that is wrapped around the bottom edge of the second texture 414. The second texture 414 can further include a first portion of the second texture image 412 (e.g., an ROI) that is wrapped around the left edge of the second texture 414 and a second portion of the second texture image 412 that is wrapped around the bottom edge of the second texture 414.

By wrapping the first texture image 404 and the second texture image 412 around the second texture 414, the tiles shared by the first texture image 404 and the second texture image 412 can be identified and reused. For example, as seen in FIG. 4, tile 3,3, tile 3,4, tile 3,5, tile 3,6, tile 4,3, tile 4,4, tile 4,5, tile 4,6, tile 5,3, tile, 5,4, tile 5,5, and tile 5,6, are shared by the first texture image 404 and the second texture image 412. By identifying the tiles that are shared by the first texture image 404 and the second texture image 412, the number of tiles that are uploaded for the second texture image 412 and the efficiency and efficacy of the upload of the second texture image 412 can be increased.

Image Pyramid

In order to cause the display of a regions of interest for a particular texture, the texture may be stored as a level of an image pyramid. Further, the image pyramid may be utilized as an object of a cache. For example, the image pyramid can be utilized as an object of a cache of the GPU in order for a component of the GPU to render the image.

Figure 5:
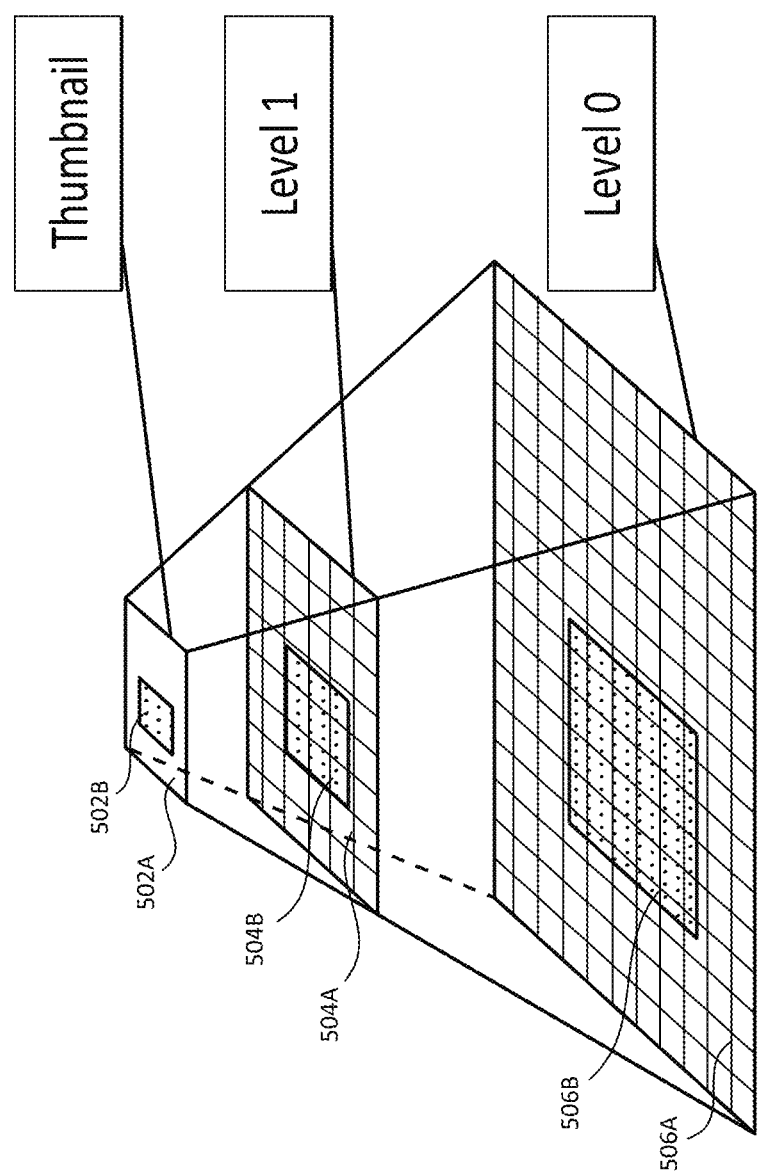
FIG. 5 illustrates an example of a texture pyramid for an image.

FIG. 5 illustrates an example image pyramid 500 that includes a plurality of levels. The image pyramid may correspond to entire image and may be located in an image file. Each level of the image pyramid 500 can be the same region of interest located at different levels (e.g., image resolutions). Therefore, each level of the image pyramid may represent the same region of interest at a particular image resolution.

For example, a first level of the image pyramid 500 can identify the region of interest at a first, base image resolution and a second level of the image pyramid 500 can identify the region of interest at a second image resolution that is higher than the first, base image resolution. In some embodiments, each level of the image pyramid 500 can be associated with a particular zoom level. In other embodiments, each level of the image pyramid 500 can be associated with a particular image resolution and a particular zoom level.

In the example of FIG. 5, the image pyramid 500 includes a first level, a second level, and a third level. It will be understood that the image pyramid 500 can include more, less, or different levels.

For instance, in one particular example, the image pyramid 500 may include seven different levels and used to represent an image (for example, with a resolution 128000× 64000). Additionally, the levels can have progressively lower resolution, for instance, Level 0—128000×64000, Level 1—64000×32000, Level 2—32000×16000, Level 3—16000×8000, Level 4—8000×4000, Level 5—4000× 2000, and Thumbnail—2000×1000. Although a particular example of levels and resolutions has been provided for illustration, other numbers of levels and/or different resolutions can be used.

The multiple levels of the image pyramid 500 can enable a progressive rendering of an image with multiple resolutions. For example, an image with a first resolution and associated with the base level of the image pyramid 500 may be rendered and may occupy 8×8 tiles. The image with a second resolution and associated with the first level of the image pyramid 500 may be rendered and may occupy 4×4 tiles. The image with a third resolution and associated with the second level of the image pyramid 500 may be rendered and may occupy 2×2 tiles. The image with a fourth resolution and associated with a thumbnail of the image pyramid 500 may be rendered. Therefore, 64 tiles may be used to display the image with the first resolution, 16 tiles may be used to display the image with the second resolution, 4 tiles may be used to display the image with the third resolution, and a single tile may be used to display the image with the fourth resolution. The region of interest of each level may be progressively rendered. In order to display the region of interest of the thumbnail, as the thumbnail can already be downloaded, an area for the region of interest can be clipped from the thumbnail. In order to display the region of interest of the second level, four tiles can be downloaded and displayed in front of the thumbnail with a better resolution than the thumbnail. In order to display the region of interest of the first level, sixteen tiles can be downloaded and displayed in front of the second level with a better resolution than the second level. In order to display the region of interest of the base level, sixty-four tiles can be downloaded and displayed in front of the first level with a better resolution than the first level. The progressive rendering of the region of interest can correspond to an iterative increase in the resolution of the region of interest during the download process.

The thumbnail (e.g., the top level, etc.) of the image pyramid 500 may include a first image 502A. The first image 502A may identify a first region of interest 502B. The second level of the image pyramid 500 may include a second image 504A. The second image 504A may identify a second region of interest 504B. The third level of the image pyramid 500 may include a third image 506A. The third image 506A may identify a third region of interest 506B.

Dynamic Mipmapping

In order to provide the regions of interest of the image pyramid 500, an image rendering technique can be utilized. The regions of interest of the image pyramid may be transferred to a texture pyramid in the GPU.

Figure 6:
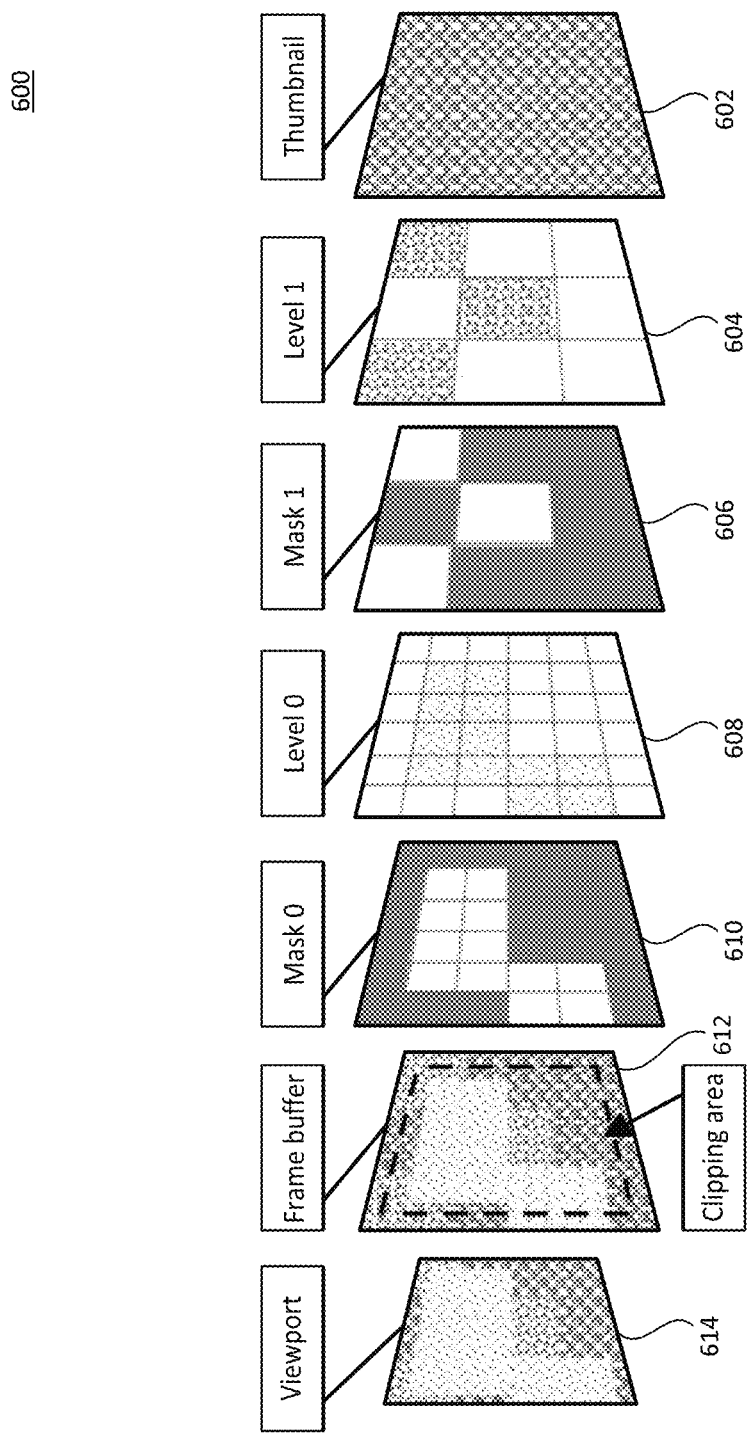
FIG. 6 illustrates an example of dynamic mipmapping for image tiles.

FIG. 6 illustrates an example image rendering technique that uses dynamic MIP (multum in parvo) mapping. It will be understood that different image rendering techniques may be used. Dynamic MIP mapping can render images of a texture pyramid. Further, a component of the GPU can use dynamic MIP mapping to render images of the texture pyramid. Through dynamic MIP mapping, a component of the GPU can cause regions of interest of levels of the image pyramid to be displayed as textures of the texture pyramid to be displayed. Each texture contains a set of tiles that presents a region of interest. Further, the component of the GPU can update the textures and the corresponding display by transitioning between textures and displaying textures corresponding to subsequent levels of the texture pyramid.

Each level of the texture pyramid may correspond to a set of received image tiles (e.g., a particular texture). For example, a first level of the texture pyramid may include a first set of received image tiles (e.g., a first texture), a second level of the texture pyramid may include a second set of received image tiles (e.g., a second texture), and a third level of the texture pyramid may include a third set of received image tiles (e.g., a third texture). As additional image tiles are received, a component of the GPU may fill precaculated textures with tiles (e.g., texture sub-images).

In some embodiments, each additional level of the texture pyramid may include a set of image tiles associated with a particular image resolution. For example, a first level of the texture pyramid may include a set of image tiles with a first image resolution, a second level of the texture pyramid may include a set of image tiles with a second image resolution, and a third level of the texture pyramid may include a set of image tiles with a third image resolution. Further, the image resolution may increase or decrease with each subsequent level of the texture pyramid.

FIG. 6 includes an example set of levels of a texture pyramid. The example set of levels may be levels of the image pyramid of FIG. 5. A top level of the texture pyramid may be a thumbnail 602.

Further, the texture pyramid may include a level 1 604. The level 1 604 may include a second set of image tiles at a second image resolution. For example, the level 1 604 may include a modified version of the base set of image tiles, the modified version representing a second set of image tiles at a second image resolution. Further, the texture pyramid may include a first mask 606. The first mask 606 (or a stencil buffer) may hide (e.g., block) areas where tiles were not updated to prevent the display of particular tiles.

The texture pyramid may include a level 0 608. The level 0 608 may include a third set of image tiles at a third image resolution. For example, the level 0 608 may include a modified version of the base set of image tiles or the first set of image tiles, the modified version representing a third set of image tiles at a third image resolution. Further, the texture pyramid may include a second mask 610. The second mask 610 (or a stencil buffer) may hide (e.g., block) areas where tiles were not updated to prevent the display of particular tiles. In some embodiments, the first set of masked image tiles and the second set of masked image tiles may be the same and/or the first mask 606 and the second mask 610 may be the same.

A component of the GPU can transmit a particular set of masked image tiles to the frame buffer for display and/or presentation. The set of masked image tiles may be clipped based at least in part on a clipping area in order to generate a view of a region of interest 612 (e.g., a clipped texture). A component of the GPU can cause the view of the region of interest 612 stored in the frame buffer to be displayed as a viewport display 614 via a viewport.

GPU-Based Renderer Portion

Figure 7:
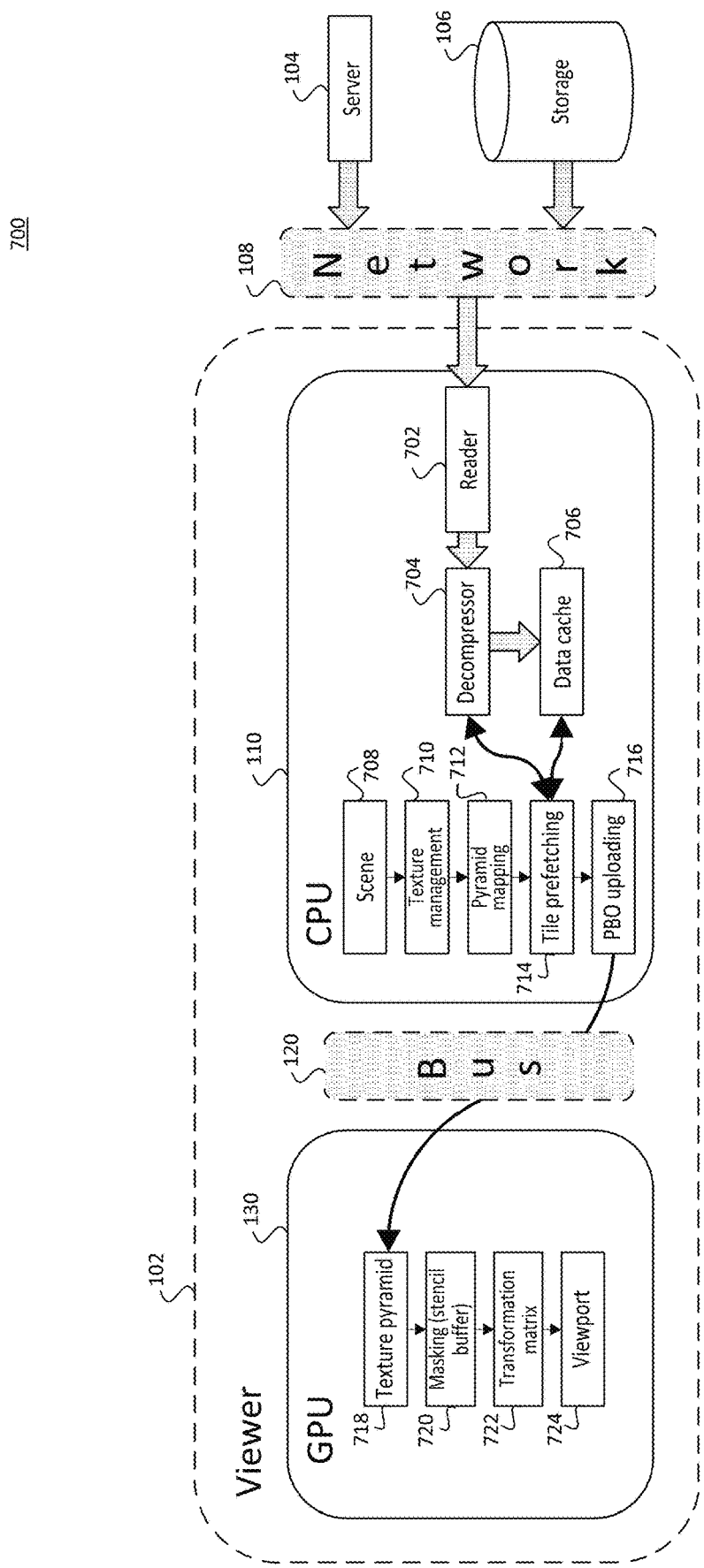
FIG. 7 is a schematic diagram of an image viewer with a GPU-based rendering pipeline.

FIG. 7 illustrates an example environment 700 in which one or more viewers 102 may be implemented according to some embodiments. The example environment 700 may include a viewer 102 that exists within a particular network 108. The viewer 102 can be in network communication with a server 104 and/or data storage 106 over the network 108. In some embodiments, the data storage 106 comprises local file storage. The example environment 700 can include more, less, or different components. The viewer 102 can communicate with the server 104 and the data storage 106 in order to receive image data such that the viewer 102 can render and/or process the received image data and cause a related image to be displayed.

The viewer 102 can include a plurality of software components in order to ender and/or process the received image data. The CPU 110 and the GPU 130 may execute one or more of the software components of the viewer 102 that perform one or more operations. Further, a component of the CPU 110 and a component of the GPU 130 may be in communication (e.g., wired communication) via the bus 120. Each of the CPU 110 and the GPU 130 may perform, via the software components, at least a portion of the rendering and/or processing process. Further, the CPU 110 may include a cache to store received image data. The viewer 102 may include more, less, or different components. The CPU 110 can include a reader 702, a decompressor 704, and a data cache 706. Further, the GPU 130 can include a viewport 724. The CPU 110 and/or the GPU 130 can execute more, less, or different software components.

A component of the CPU 110 can receive image data from one or more of the server 104 or the data storage 106 via the network 108. In some embodiments, the component of the CPU 110 can receive image from local file storage. The server 104 and/or the data storage 106 may receive imaging data (directly or indirectly) from an imaging device (e.g., a camera, a scanning device, a mobile device, a computer, etc.). In some embodiments, one or more of the server 104 or the data storage 106 may include an imaging device. The reader 702 of the CPU 110 may reads the compressed image data from one or more of the server 104 or the data storage 106 via the network 108. The reader 702 may transmit the compressed image data to a decompressor 704.

With continuing reference to FIG. 7, the decompressor 704 may decompress the compressed image data in order to generate decompressed image data. The decompressor 704 may store at least a portion of the decompressed image data in a cache 706. In some embodiments, the decompressor 704 stores all of the decompressed image data in the cache 706. In other embodiments, the decompressor 704 determines that a portion of the decompressed image data has not previously been stored in the cache 706 and, based on this determination, stores the portion of the decompressed image data in the cache 706. The decompressor 704, for an initial set of decompressed image data, may store the entire set of decompressed image data in the cache 706. For subsequent sets of decompressed image data, the decompressor 704 may store only a portion of the set of decompressed image data in the cache 706. The tile prefetcher may check if a tile is in the cache 706. In the event that the tile prefetcher determines a tile is not located in the cache 706, the tile prefetcher may request the tile from the decompressor 704. Therefore, in response to the tile prefetcher, the decompressor 704 may provide at least a portion of the set of decompressed image data for tile prefetching.

A component of the CPU 110 (e.g., the CPU renderer) can receive the image data 708 (e.g., data of a scene). The scene may be an object (e.g., structure) that includes image metadata associated with an image and rendering parameters. The image metadata may be included at an opening of the image. The rendering parameters may be defined by a user (e.g., through a viewer's user interface). The user may perform operations (panning, zooming, etc.) and these operations may be translated to rendering parameters (coordinates, size of a region of interest, etc.). Therefore, the image data may include a presentation of a particular image. The image data 708 may be image data 708 received by the reader 702 and read by the reader 702 into the component of the CPU 110. Based on the received image data 708, the component of the CPU 110 can perform texture management 710. The texture management 710 may be an algorithm that defines a size of texture pyramid and allocates GPU textures, reallocates GPU textures, or reuses existing GPU textures within the texture pyramid based on rendering parameters and image information from the scene. Further, the component of the CPU 110 may allocate and re-allocate textures when parameters are modified (e.g., when zooming, when the window size is modified, etc.).

Based on the texture management 710, a component of the CPU 110 may identify a plurality of textures. Using the plurality of textures, the component of the CPU 110 can perform pyramid mapping 712. The pyramid mapping 712 may be an algorithm that maintains a set of arrays synchronized to GPU textures (e.g., the texture pyramid) with information of tiles uploaded to textures. Based on this information the algorithm can determine which tiles can be reused and which tiles should be uploaded to GPU. Pyramid mapping can create a list of the tiles for a tile prefetcher.

Based on the pyramid mapping 712, a component of the CPU 110 can determine the tiles that make up a particular texture. The component of the CPU 110 can perform tile prefetching 714 by utilizing the list from the pyramid mapping 712 algorithm. Based on this list, the component of the CPU can obtain the tiles. In some embodiments, the component of the CPU can asynchronously obtain the tiles using multiple threads. The tile prefetcher can store the obtained tiles in PBOs. Further, based on the obtained tiles, the component of the CPU 110 can perform PBO uploading 716. The PBO uploading 716 can be an algorithm that transfers CPU located buffers (PBOs) to GPU textures as texture sub-images (tiles).

The component of the GPU 130 can obtain the tiles for each texture. Further, based on the obtained tiles, a component of the GPU 130 can obtain (e.g., generate, determine, etc.) a texture pyramid 718. The texture pyramid 718 can include a set of textures for receiving tiles as texture sub-images. Textures can be part of the GPU rendering pipeline. Further, data stored in textures can be visible on screen. The texture pyramid 718 may include a set of textures as levels of the texture pyramid 718. Each texture may further be a representation of a scene. Further, each texture may be a representation of the scene at a particular resolution level. The set of textures may include a plurality of representations of the same scene, each at a different image resolution level.

The texture pyramid 718 may include the textures ranked according to the image resolution of each texture. For example, a first level of the texture pyramid 718 may include a first texture with a first image resolution, a second level of the texture pyramid 718 may include a second texture with a second image resolution, and a third level of the texture pyramid 718 may include a third texture with a third image resolution. The levels of the texture pyramid 718 may gradiently increase or decrease in image resolution. For example, a first level of the texture pyramid 718 may have a base image resolution and a second level of the texture pyramid 718 may have a second image resolution that is lower than the base image resolution.

A component of the GPU 130 can further perform masking 720 of a particular texture of the texture pyramid 718. The masking 720 can be a GPU operation to hide parts of textures those are not valid for displaying on the screen In some embodiments, the component of the GPU 130 may perform masking 720 of each level of the texture pyramid 718. The component of the GPU 130 may perform masking 720 in order to mask (e.g., hide, cover, etc.) tiles of a particular texture that have not been uploaded to the component of the GPU 130. In some embodiments, the component of the GPU 130 may perform masking 720 in order to mask tiles of a particular texture that have not been uploaded to a component of the CPU 110.

By performing the masking 720, the component of the GPU 130 may focus a texture on the uploaded tiles (e.g., highlight the uploaded tiles of the texture). A component of the GPU 130 can further apply a transformation matrix 722 in order to transform a particular texture. The transformation matrix 722 may be a portion of the GPU pipeline responsible for an operation (e.g., panning, zooming, rotation). A texture may be displayed via a viewport. The viewport may be a receiver of the image at the end of the GPU pipeline.

Figure 8:
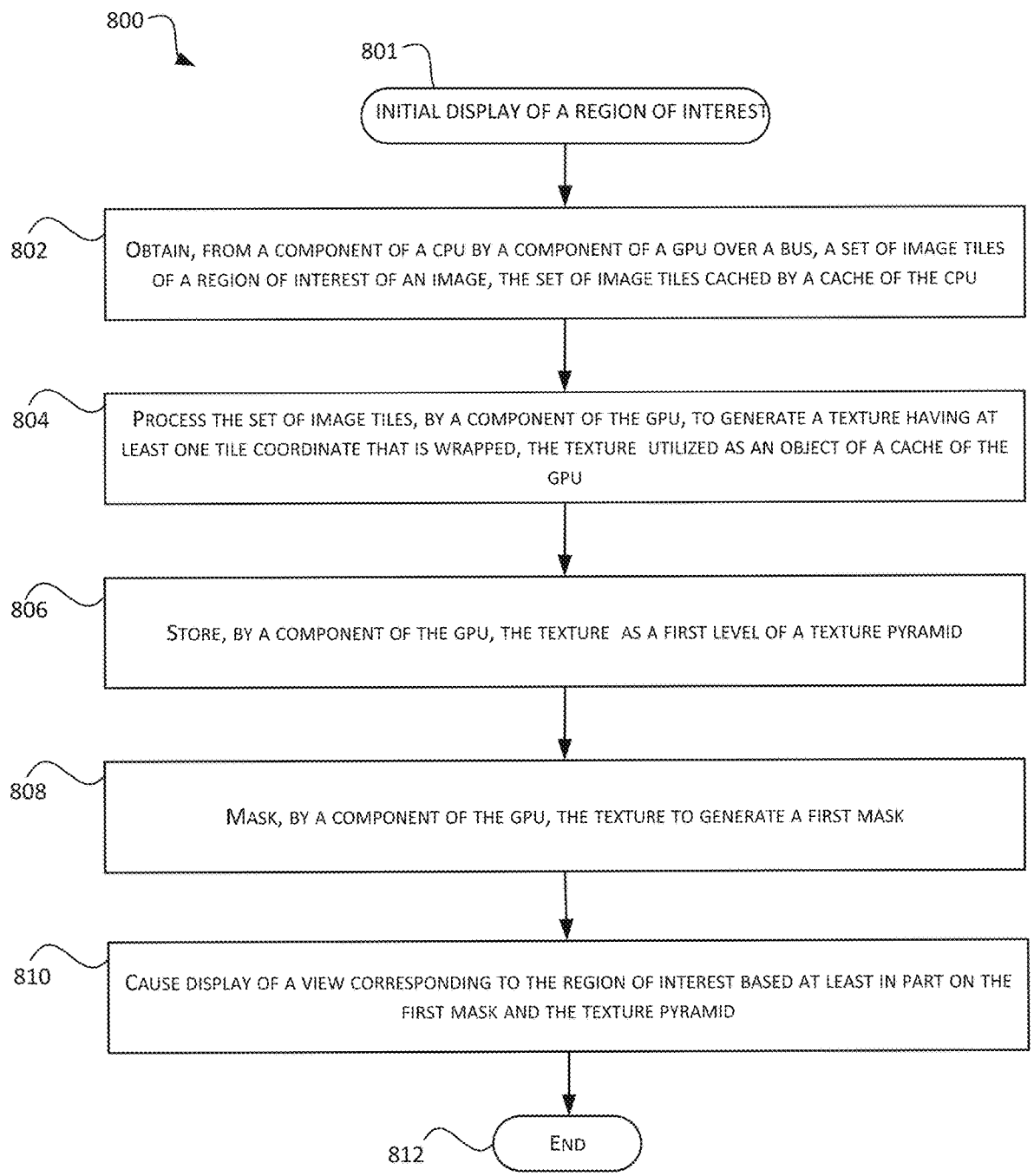
FIG. 8 is a flowchart of an example routine for uploading an initial image.

FIG. 8 describes an illustrative process 800 for initially displaying a region of interest of a particular image. The process 800 includes obtaining a set of image tiles and processing the set of image tiles in order to cause display of a corresponding view. Further, the process 800 includes generating a texture based on the set of image tiles and utilizing the texture as an object of a cache of a GPU as a level of a texture pyramid. By using such a texture and a texture pyramid, the efficiency and efficacy of the imaging process can be increased.

The process 800 begins at block 802. The process 800 may begin automatically upon receiving a set of image data. For example, a user may transmit a set of image data to an imaging system via an imaging device, a server, a data storage, etc. Further, a user may initiate an opening of an image in a viewer. The viewer can open the file with the image and read metadata using a reader of the viewer and prepare internal viewer elements (e.g., the decompressor, scene, etc.) for further processing and rendering tasks. A component of a CPU can create components for a rendering pipeline (e.g., a texture pyramid) based on a view size and/or a location of the region of interest on the image. An initial state of the image (e.g., a thumbnail) may be available for rendering because it was downloaded during the image opening process. The process 800 may be embodied in a set of executable program instructions stored on a computer-readable medium, such as one or more disk drives, of a computing system of a node or a server. When the process 800 is initiated, the executable program instructions can be loaded into memory, such as RAM, and executed by one or more processors of a computing system.

Upon initiation of the process, at block 802, a component of a GPU executing the process 800 (e.g., a GPU of the imaging system) obtains, from a component of a CPU over a bus, a set of image tiles (e.g., a plurality of image tiles) of a region of interest of an image. A component of the GPU can obtain the set of image tiles via a singular upload of the set of image tiles. The CPU may include a first portion of the renderer that performs a first portion of the image rendering and the GPU may include a second portion of the renderer that performs a second portion of the image rendering. In order to prepare the set of tiles for a necessary resolution, the component of the CPU can provide the set of tiles to a prefetcher. Further, the component of the CPU can generate texture map that identifies the position of each tile. Each tile may be uploaded to a corresponding position in a GPU texture. In some embodiments, the set of image tiles may include a set of compressed image tiles. The prefetcher can request the set of tile from the decompressor. The decompressor can load the compressed tiles and decompress the compressed tiles. Further, the decompressed tiles can be stored in a data cache for possible reuse. Upon determining that a decompressed tile is available, the prefetcher can copy the decompressed tile to PBO of the CPU. A component of the CPU may transmit the available PBOs to a component of the GPU over the bus. In some embodiments, the available PBOs may be transferred to the component of the GPU until each of the tiles are transferred. The component of the CPU can produce one or more views during the prefetching of the tiles. Therefore, the component of the CPU can produce multiple views such that a view may appear to have a first resolution (e.g., be blurred) at a first time and one or more portions of the view may obtain a better resolution (e.g., obtain more clarity) at a second time such that the clarity of the view increases. In some embodiments, the transfer of the PBOs may be an asynchronous process.

At block 804, a component of the GPU processes the set of image tiles to generate a texture. The texture may include at least one tile coordinate that is wrapped. For example, the at least one tile coordinate may be wrapped according to toroidal wrapping. Further, the texture may be utilized as an object of a cache of the GPU.

At block 806, a component of the GPU stores the texture as a first level of a texture pyramid. In some embodiments, storing the texture as the first level of the texture pyramid may be based at least in part on the toroidal wrapping. The first level of the texture pyramid may include a first image resolution. Further, the first level of the texture pyramid may include a representation of the region of interest according to the first image resolution. The texture pyramid may include a plurality of levels and each level of the texture pyramid may include a region of interest based on the particular image resolution. In some embodiments, the component of the GPU can generate the texture pyramid. In order to generate the texture pyramid, the component of the GPU can perform one or more mappings. Further, the component of the GPU can utilize a plurality of textures as a plurality of objects of the cache of the GPU. For example, the computing may perform a dynamic mipmapping in order to generate the texture pyramid.

At block 808, a component of the GPU masks the texture to generate a first mask. Generating the first mask may be based at least in part on a second set of image tiles. The component of the GPU can further determine that the second set of image tiles are absent from the set of image tiles.

In some embodiments, the component of the GPU may store multiple textures. The component of the GPU can obtain a second plurality of image tiles from a component of the CPU over the bus. The second plurality of image tiles may include a representation of the region of interest according to a second image resolution. The component of the GPU can process the second plurality of image tiles to generate a second texture. The second texture may include at least one tile coordinate that is wrapped. For example, the at least one tile coordinate may be wrapped according to toroidal wrapping. The second texture may be utilized as a second object of the cache of the GPU. The component of the GPU can store the second texture as a second level of the texture pyramid. The component of the GPU can mask the second texture to generate a second mask. Further, the component of the GPU can cause display of a second view corresponding to the region of interest based at least in part on the second mask and the texture pyramid. In some embodiments, the component of the GPU can cause display of the first view while the second view is loading, and upon determining, that the second view has loaded, cause display of the second view.

At block 810, a component of the GPU causes display of an view corresponding to the region of interest based at least in part on the first mask and the texture pyramid. In some embodiments, prior to causing display of the view, the component of the GPU can perform one or more of panning the view, rotating the view, interpolating the view, or performing additional image operations. Further, the component of the GPU can cause display of a plurality of views, each view having a particular image resolution.

Figure 9:
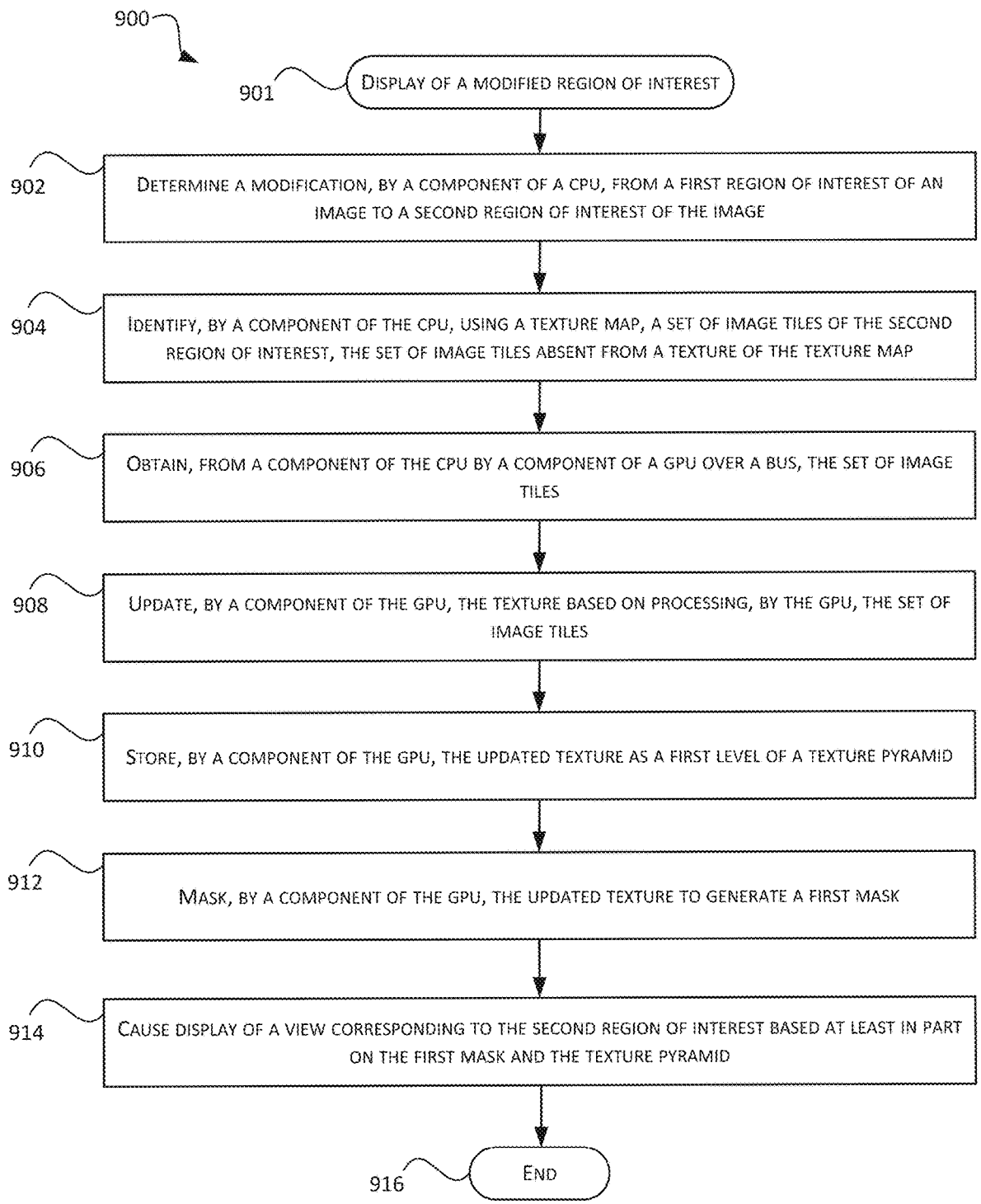
FIG. 9 is a flowchart of an example routine for modifying an initial image.

FIG. 9 describes an illustrative process 900 for displaying a modified region of interest for a particular image. The process 900 includes determining a modification from a first region of interest to a second region of interest and identifying and obtaining a set of new image tiles. For example, the modification may include a panning operation. The modification may be received through a viewer user interface. Further, the process 900 includes updating a texture based on the set of new image tiles and storing the updated texture. Further, the process 900 includes masking the updated texture and causing display of a view based on the masking. By using a prior texture in such a way, an efficient display of a modified region of interest can be implemented.

The process 900 begins at block 902. The process 900 may begin automatically upon receiving an indication of a modification to the region of interest. For example, a component of a CPU may receive an indication, from a user computing device, that the region of interest has been modified (e.g., a panning operation has been performed). The process 900 may be embodied in a set of executable program instructions stored on a computer-readable medium, such as one or more disk drives, of a computing system of a node or a server. When the process 900 is initiated, the executable program instructions can be loaded into memory, such as RAM, and executed by one or more processors of a computing system. A computing device executing the process 900 (e.g., the viewer) may include a CPU and a GPU. Upon initiation of the process, at block 902, the component of the CPU may determine a modification from a first region of interest of an image to a second region of interest of the image. The modification may be received via a viewer user interface. Further, a component of the CPU can obtain the modified parameters. Based on the modified parameters, the component of the CPU can calculate a new region of interest that includes a new tileset. The new tileset may include one or more tiles in common with the previous tileset (e.g., the new tileset may be partly overlapped with the previous tileset).

At block 904, a component of the CPU identifies, using a texture map, a set of image tiles of the second region of interest, the set of image tiles absent from a texture of the texture map. The component of the CPU can further identify a second set of image tiles that are included in the texture of the texture map. Using a texture map, the component of the CPU can identify the tiles that can be reused for the current texture and tiles that need to be prefetched. The component of the CPU can create a tileset that includes tiles those are not uploaded to a texture. The component of the CPU can further update the texture map to be synchronized to the GPU texture. The component of the CPU can asynchronously download the set of image tiles from a decompressor. In some embodiments, the image tiles can be downloaded and stored in a data cache, therefore, prior to requesting the tiles from the decompressor, the prefetcher may check the data cache. If the tile is stored in the data cache, the prefetcher can obtain the tiles from the data cache. In the event that the tile is not stored in the data cache, the tile can be requested from the Decompressor.

At block 906, a component of the GPU obtains, from a component of the CPU over a bus, a designation of the set of image tiles. The component of the GPU can perform the multi-frame (e.g., progressive) rendering of the image using the obtained set of image tiles.

At block 908, a component of the GPU updates the texture based on processing, by the component of the GPU, the set of image tiles in order to generate an updated texture. The updated texture and the texture may include a first set of shared image tiles.

At block 910, a component of the GPU stores the updated texture as a first level of a texture pyramid. The component of the GPU can replace the texture with the updated texture as the first level of the texture pyramid.

At block 912, a component of the GPU masks the updated texture to generate a first mask. In some embodiments, the first mask may be based at least in part on a previously generated mask for the texture.

At block 914, a component of the GPU causes display of an view corresponding to the second region of interest based at least in part on the first mask and the texture pyramid. The component of the GPU may cause the display of the view as a sequential display of the view based on prior display of a prior view.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An imaging apparatus comprising:
   a memory circuit storing computer-executable instructions; and
   a first hardware processing unit configured to execute the computer-executable instructions, wherein execution of the computer-executable instructions causes the first hardware processing unit to:
      obtain a plurality of image tiles of a region of interest of an image from a second hardware processing unit of the imaging apparatus;
      generate a texture from the plurality of image tiles, wherein the texture corresponds to an object of a cache of the first hardware processing unit;

generate a first mask based on masking the texture; and
cause display of a view corresponding to the region of interest of the image based at least in part on the first mask;
wherein the execution of the computer-executable instructions further causes the first hardware processing unit to:
store the texture as a first level of a texture pyramid, wherein the first level of the texture pyramid corresponds to a first zoom level;
obtain a second plurality of tiles of the region of interest from the image from the second hardware processing unit of the imaging apparatus;
generate a second texture from the second plurality of image tiles;
store the second texture as a second level of the texture pyramid, wherein the second level of the texture pyramid corresponds to a second zoom level, wherein the second zoom level is higher than the first zoom level;
generate a second mask based on masking the second texture; and
cause display of a portion of the second texture based at least in part on the second mask in response to a user zoom operation.

2. The imaging apparatus of claim 1, wherein the execution of the computer-executable instructions further causes the first hardware processing unit to:
upload the plurality of image tiles to the texture;
obtain the plurality of image tiles from the texture; and
utilize the plurality of image tiles for a subsequent operation without reobtaining the plurality of image tiles from the second hardware processing unit based at least in part on the texture corresponding to the object of the cache.

3. The imaging apparatus of claim 1, wherein the texture corresponds to an implicit cache of the first hardware processing unit.

4. The imaging apparatus of claim 1, wherein the texture corresponds to a visualization object and an implicit cache of the first hardware processing unit.

5. The imaging apparatus of claim 1, wherein the cache and the memory circuit comprise different data storage.

6. The imaging apparatus of claim 1, wherein one or more of the memory circuit or the cache is controlled by or physically embedded in the first hardware processing unit.

7. The imaging apparatus of claim 1, wherein the first hardware processing unit comprises a graphical processing unit and the second hardware processing unit comprises a central processing unit.

8. The imaging apparatus of claim 1, wherein the memory circuit comprises a first memory circuit and the cache comprises a first cache, wherein obtaining the plurality of image tiles from the second hardware processing unit comprises obtaining the plurality of image tiles from:
a second cache of the second hardware processing unit, the second cache controlled by or physically embedded in the second hardware processing unit, or
a second memory circuit of the second hardware processing unit, the second memory circuit controlled by or physically embedded in the second hardware processing unit.

9. The imaging apparatus of claim 1, wherein the second hardware processing unit is configured to:
identify, using a texture map, a second plurality of image tiles of a second region of interest of the image that are absent from the texture,
wherein the execution of the computer-executable instructions further causes the first hardware processing unit to:
obtain the second plurality of image tiles from the second hardware processing unit;
generate an updated texture based on processing the second plurality of image tiles; and
store the updated texture.

10. The imaging apparatus of claim 1, wherein the texture is wrapped in two dimensions, wherein the texture has at least one tile coordinate wrapped using toroidal wrapping.

11. The imaging apparatus of claim 1, wherein the plurality of image tiles comprises a plurality of compressed image tiles, wherein the second hardware processing unit is configured to:
read the plurality of compressed image tiles; and
decompress the plurality of compressed image tiles using a decompressor.

12. A computer-implemented method comprising:
obtaining, by a first hardware processing unit of an imaging apparatus, a plurality of image tiles of a region of interest of an image from a second hardware processing unit of the imaging apparatus;
generating, by the first hardware processing unit, a texture from the plurality of image tiles, wherein the texture corresponds to an object of a cache of the first hardware processing unit;
generating, by the first hardware processing unit, a first mask based on masking the texture;
causing display, by the first hardware processing unit, of a view corresponding to the region of interest of the image based at least in part on the first mask;
storing the texture as a first level of a texture pyramid, wherein the first level of the texture pyramid corresponds to a first zoom level;
obtaining a second plurality of tiles of the region of interest from the image from the second hardware processing unit of the imaging apparatus;
generating a second texture from the second plurality of image tiles;
storing the second texture as a second level of the texture pyramid, wherein the second level of the texture pyramid corresponds to a second zoom level, wherein the second zoom level is higher than the first zoom level;
generating a second mask based on masking the second texture; and
causing display of a portion of the second texture based at least in part on the second mask in response to a user zoom operation.

13. A non-transitory computer-readable medium storing computer executable instructions that, when executed by one or more computing devices of an imaging apparatus, cause the one or more computing devices to:
obtain, by a first hardware processing unit of the one or more computing devices, a plurality of image tiles of a region of interest of an image from a second hardware processing unit of the one or more computing devices;
generate, by the first hardware processing unit, a texture from the plurality of image tiles, wherein the texture corresponds to an object of a cache of the first hardware processing unit;
generate, by the first hardware processing unit, a first mask based on masking the texture; and
cause display, by the first hardware processing unit, of a view corresponding to the region of interest of the image based at least in part on the first mask;

wherein the execution of the computer-executable instructions further causes the first hardware processing unit to:
store the texture as a first level of a texture pyramid, wherein the first level of the texture pyramid corresponds to a first zoom level;
obtain a second plurality of tiles of the region of interest from the image from the second hardware processing unit of the imaging apparatus;
generate a second texture from the second plurality of image tiles;
store the second texture as a second level of the texture pyramid, wherein the second level of the texture pyramid corresponds to a second zoom level, wherein the second zoom level is higher than the first zoom level;
generate a second mask based on masking the second texture; and
cause display of a portion of the second texture based at least in part on the second mask in response to a user zoom operation.

14. The non-transitory computer-readable medium of claim 13, wherein execution of the computer-executable instructions by the one or more computing devices further causes the one or more computing devices to:
upload, by the first hardware processing unit, the plurality of image tiles to the texture;
obtain, by the first hardware processing unit, the plurality of image tiles from the texture; and
utilize, by the first hardware processing unit, the plurality of image tiles for a subsequent operation without reobtaining the plurality of image tiles from the second hardware processing unit based at least in part on the texture corresponding to the object of the cache.

15. The non-transitory computer-readable medium of claim 13, wherein the texture corresponds to an implicit cache of the first hardware processing unit.

16. The non-transitory computer-readable medium of claim 13, wherein execution of the computer-executable instructions by the one or more computing devices further causes the one or more computing devices to generate, by the first hardware processing unit, a frame buffer based on masking the texture using the first mask, wherein the view corresponds to a clipped portion of the frame buffer.

17. The non-transitory computer-readable medium of claim 13, wherein execution of the computer-executable instructions by the one or more computing devices further causes the one or more computing devices to store, by the first hardware processing unit, the texture as a level of a texture pyramid, wherein the texture pyramid comprises the level and a thumbnail, wherein the texture pyramid includes a plurality of levels each corresponding to a different resolution level of the image.

18. The non-transitory computer-readable medium of claim 13, wherein the plurality of image tiles comprises a first set of image tiles and a second set of image tiles, wherein to obtain the plurality of image tiles from the second hardware processing unit, execution of the computer-executable instructions by the one or more computing devices further causes the one or more computing devices to obtain, in parallel, by the first hardware processing unit, a first image tile from the first set of image tiles and a second image tile from the second set of image tiles using one or more picture buffer objects.

* * * * *